United States Patent [19]
Jacobson

[11] Patent Number: 6,007,319
[45] Date of Patent: *Dec. 28, 1999

[54] CONTINUOUS FORMING OF COMPLEX MOLDED SHAPES

[75] Inventor: Theodore L. Jacobson, Pacifica, Calif.

[73] Assignee: Continuous Molding, Inc., Pacifica, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/730,697

[22] Filed: Oct. 11, 1996

Related U.S. Application Data

[60] Division of application No. 08/159,337, Nov. 30, 1993, Pat. No. 5,573,716, which is a continuation-in-part of application No. PCT/US92/08505, Oct. 6, 1992, which is a continuation-in-part of application No. 07/775,642, Oct. 10, 1991, Pat. No. 5,266,021.

[51] Int. Cl.⁶ .................................................. B29C 53/00
[52] U.S. Cl. ..................... 425/140; 425/377; 425/378.1; 425/381; 425/466
[58] Field of Search .................. 264/40.1, 40.7, 264/167, 175, 177.1, 177.16, 177.17, 210.1, 210.2, 210.7, 211.12, 214, 339, 535; 425/135, 140, 141, 150, 319, 325, 328, 377, 378.1, 381, 465, 466, 72.1, 326.1, 334, 384, 387.1, 391, 396, 397, 403, 113, 115, 224, 324.1

[56] References Cited

U.S. PATENT DOCUMENTS

| | | | |
|---|---|---|---|
| 4,252,512 | 2/1981 | Kornylak | 425/89 |
| 4,439,125 | 3/1984 | Dieckmann et al. | 425/140 |
| 4,721,447 | 1/1988 | Erckmann | 425/141 |
| 4,744,745 | 5/1988 | Harada et al. | 425/466 |
| 4,749,347 | 6/1988 | Valavaara | 264/40.1 |
| 4,749,535 | 6/1988 | Matsuda | 264/151 |
| 4,755,334 | 7/1988 | Grimm et al. | 264/40.1 |
| 4,755,927 | 7/1988 | Kishi et al. | 364/191 |
| 4,770,017 | 9/1988 | Yamashita et al. | 72/168 |
| 4,777,005 | 10/1988 | Miller | 264/339 |
| 4,865,796 | 9/1989 | Tamura et al. | 264/40.7 |
| 4,955,803 | 9/1990 | Miller et al. | 264/40.7 |
| 4,990,078 | 2/1991 | Tomita | 425/141 |
| 5,266,021 | 11/1993 | Jacobson | 264/40.1 |
| 5,573,716 | 11/1996 | Jacobson | 264/40.7 |

FOREIGN PATENT DOCUMENTS

| | | | |
|---|---|---|---|
| 2123739 | 2/1984 | United Kingdom | 425/150 |

*Primary Examiner*—Jill L. Heitbrink
*Attorney, Agent, or Firm*—Townsend & Townsend and Crew LLP

[57] ABSTRACT

A method, process and apparatus for generating complex shapes without the use of dies, molds, or other fixed tooling. A continuous length or flow of a malleable or fluent material is provided to a forming apparatus which shapes the material, producing a contiguous series of smoothly blended, properly contoured portions of the desired shape. The formation of a shape relies on continuous control of shape-determining variables: the instantaneous cross-section of the shape in a virtual transition surface between the formable and formed material, the rate-of-change of cross-sectional dimensions between sequential cross-sections, the instantaneous angle of movement of the material at any point on the cross-section in the transition surface, and the rate of movement away from the transition surface of the just-stabilized portion of the shape. The material is stabilized as these shape-determining variables achieve the proper values in each portion of the material. The invention further provides a technique for analyzing and modifying a computer model of a desired shape, and for developing a process control datafile from the models.

3 Claims, 25 Drawing Sheets

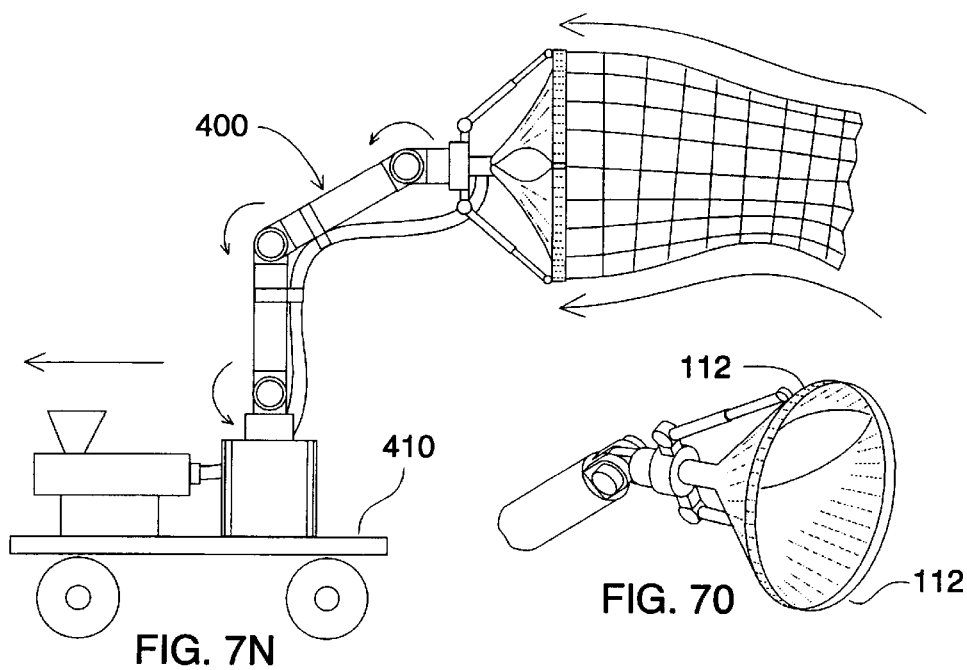
FIG. 7N
FIG. 7O
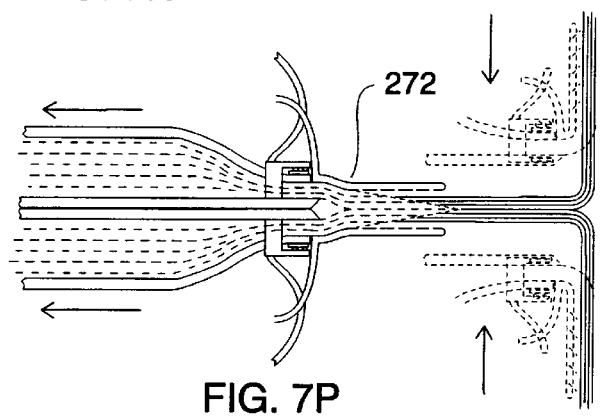
FIG. 7P
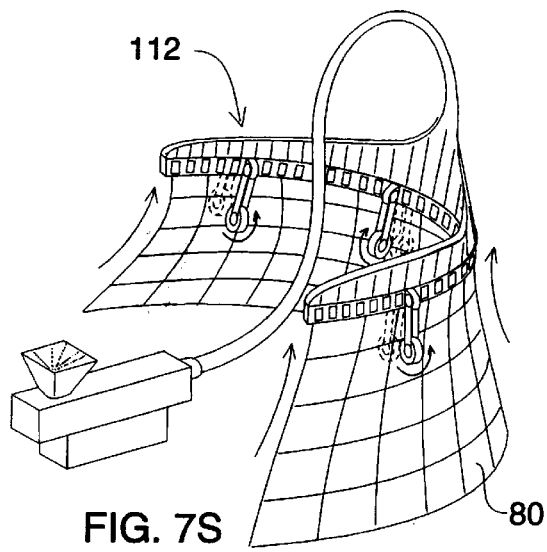
FIG. 7S
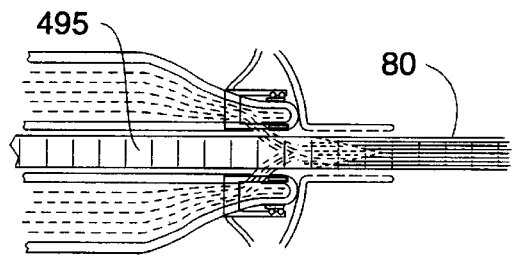
FIG. 7Q
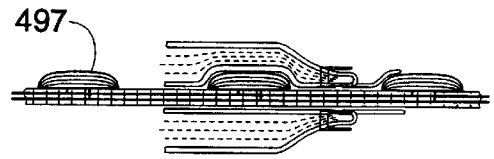
FIG. 7R

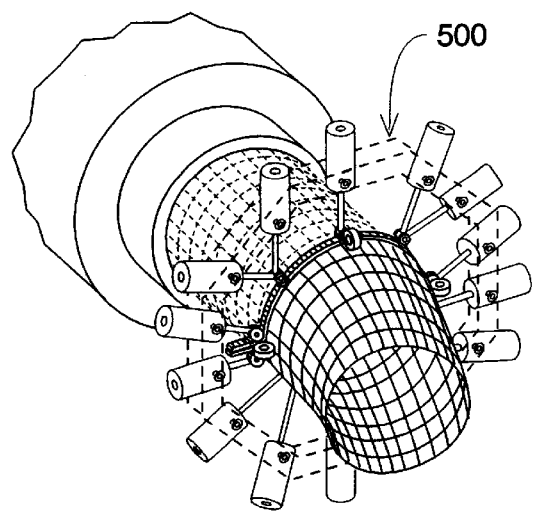
FIG. 8A
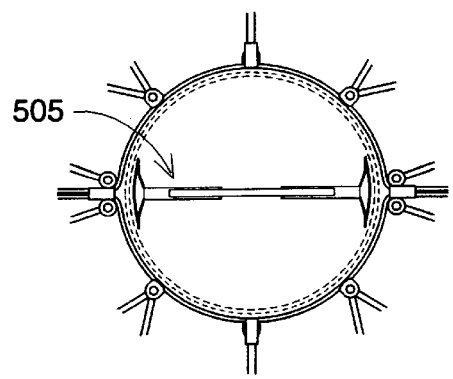
FIG. 8B
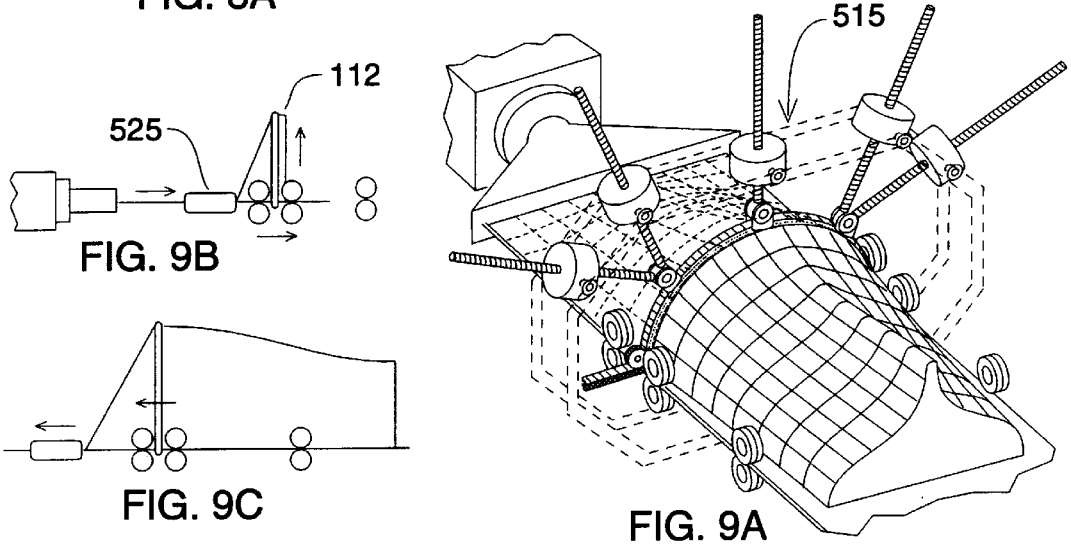
FIG. 9B
FIG. 9C
FIG. 9A
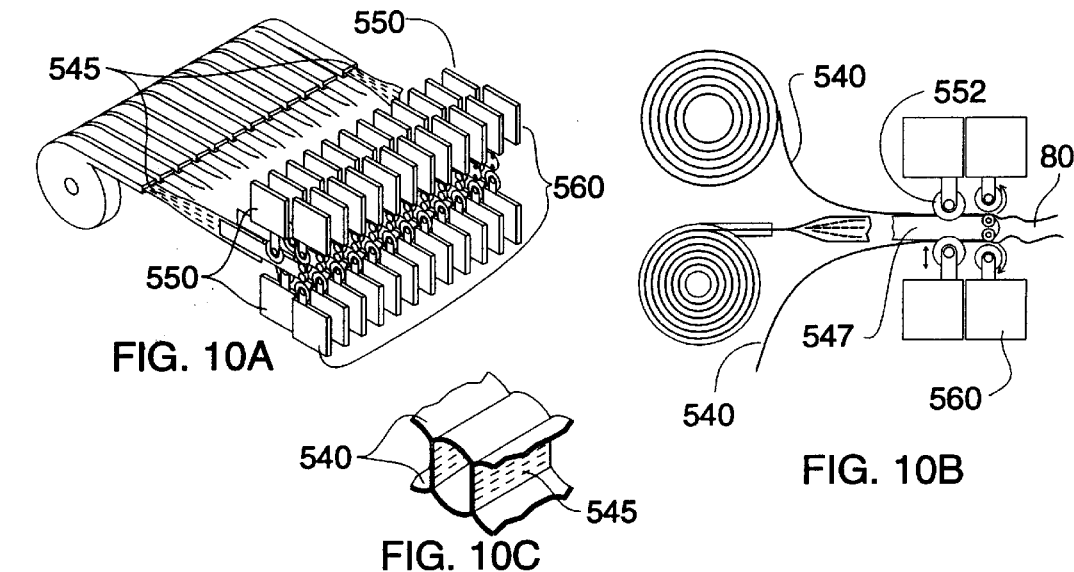
FIG. 10A
FIG. 10C
FIG. 10B

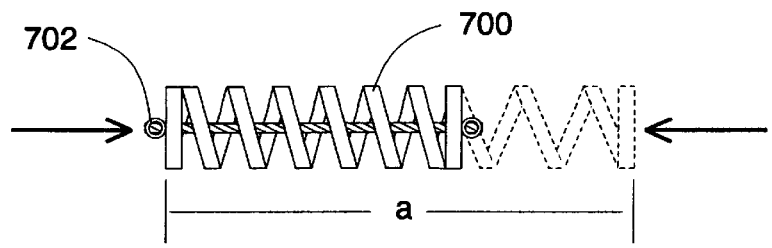
FIG. 15
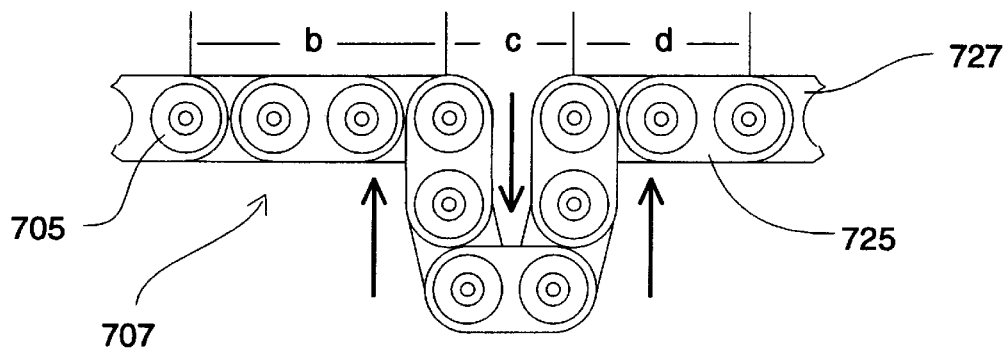
FIG. 16A
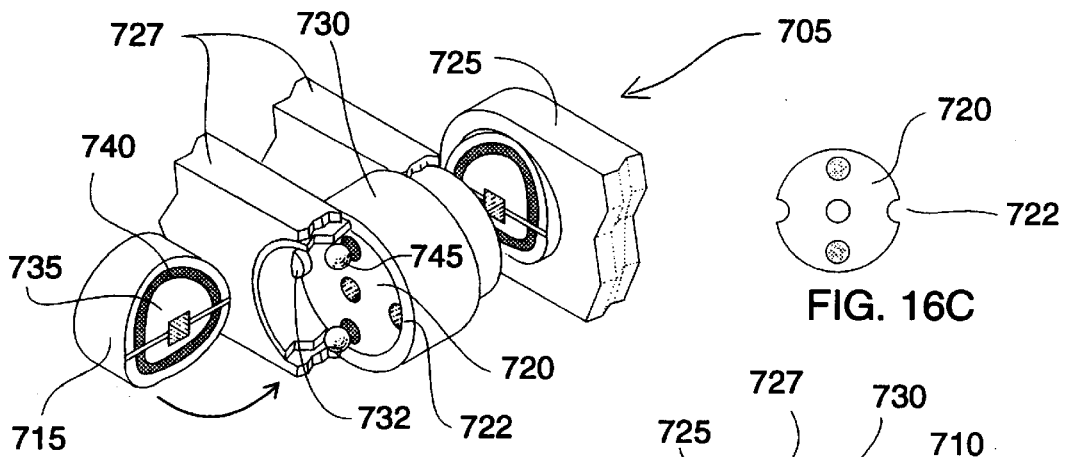
FIG. 16B
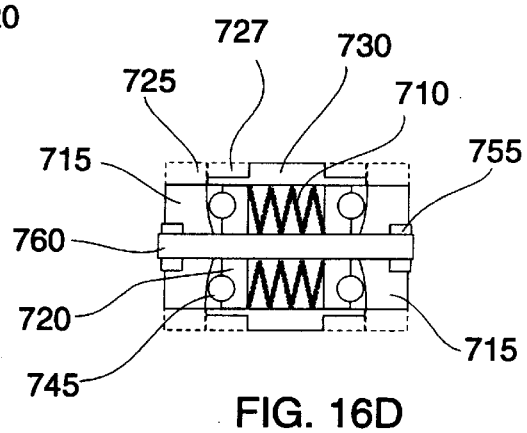
FIG. 16C
FIG. 16D

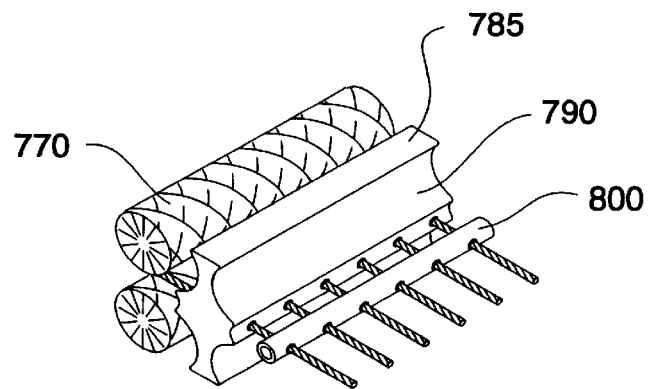
FIG. 17A
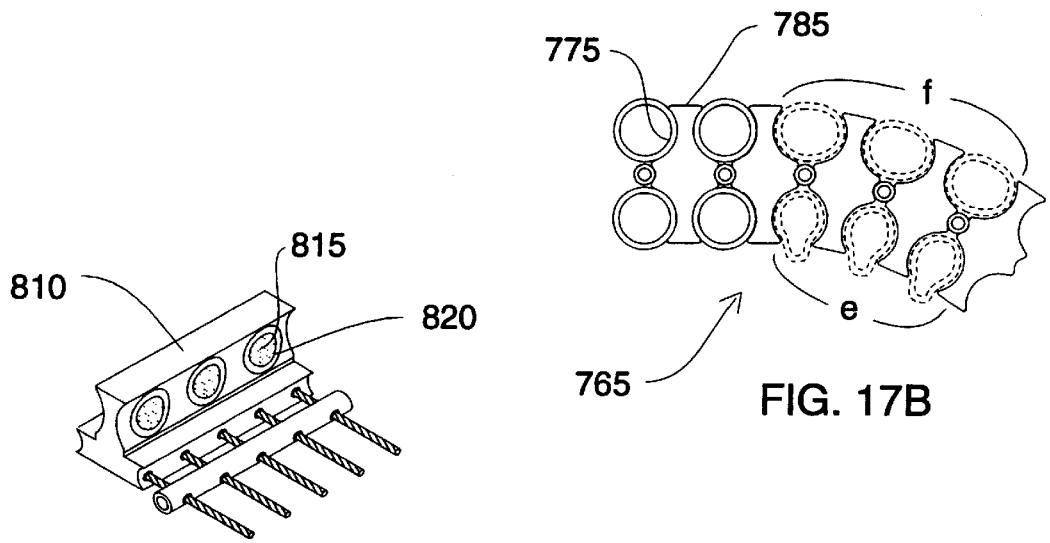
FIG. 17B
FIG. 17C
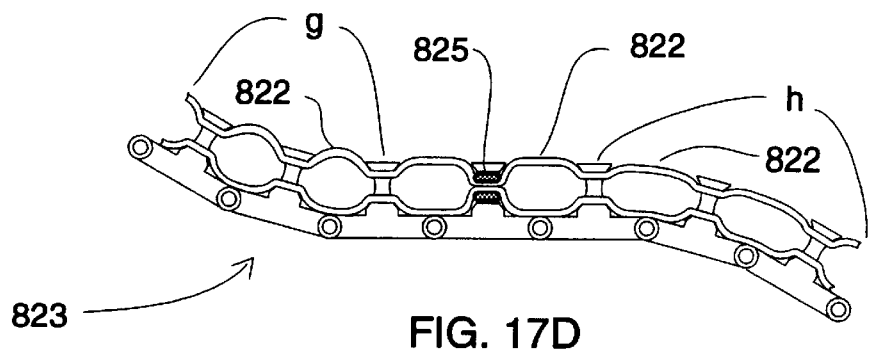
FIG. 17D

835

830

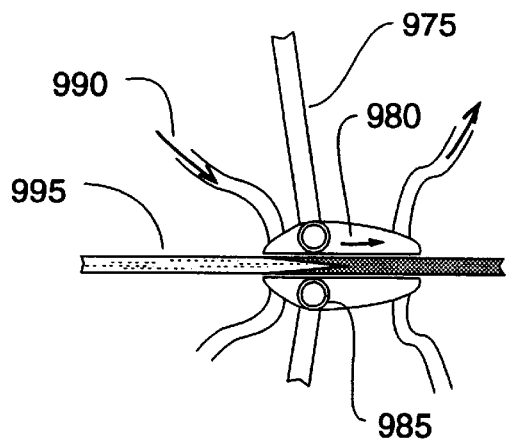
FIG. 20C
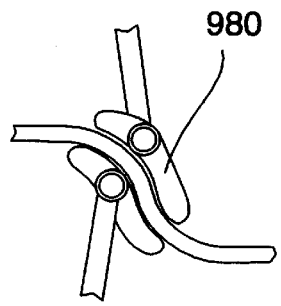
FIG. 20D
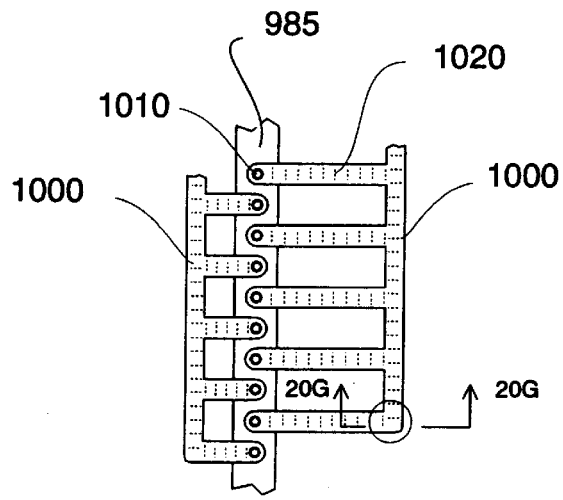
FIG. 20F
FIG. 20G
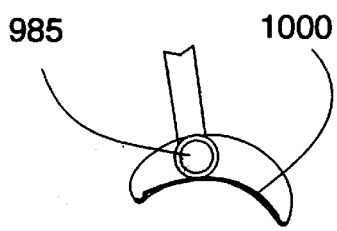
FIG. 20E

CONTINUOUS FORMING OF COMPLEX MOLDED SHAPES

CROSS REFERENCE TO RELATED APPLICATIONS

This is a division of U.S. application Ser. No. 08/159,337, filed Nov. 30, 1993, now U.S. Pat. No. 5,573,716, which is itself a continuation-in-part of PCT application Ser. No. PCT/US92/08505, filed Oct. 6, 1992, which is a continuation-in-part of U.S. application Ser. No. 07/775,642, filed Oct. 10, 1991, now U.S. Pat. No. 5,266,021, issued Nov. 30, 1993.

BACKGROUND OF THE INVENTION

The present invention relates generally to molding and forming processes and more specifically to the continuous forming of compound-curved (doubly-curved, complex) shapes (such as shell structures) without the use of molds or dies.

The prior art for mass-producing identical shapes with complex contours includes a variety of molding, casting, and die stamping processes. Almost all such processes have relied on single-purpose tooling in the form of molds, dies, or masters. The disadvantages of these processes come from their reliance on such dedicated tooling and the costs associated with it. In the design and manufacturing stages, a group of specialists in product design, manufacturing engineering, and die-making must work together, with the time and expense of their collaboration becoming less predictable as the degree of novelty and complexity of a desired shape increases. Additionally, the required tooling is often complicated and requires continuing highly-skilled maintenance. Finally, tooling that goes in and out of service has continuing overhead costs associated with storage, including risk of damage, deterioration, and inventory expenses.

These costs, along with the risk of undertaking a project with unpredictable time and expense factors, can reduce the degree of innovation or variety a manufacturer is willing to incorporate into a product line. At the same time, increasing competitive pressures are driving the markets for many goods, with the difference between success or failure for a product line or an entire company often depending on the company's ability to have a quick response to market changes, or to lead the market through product innovation and variety. The capabilities for producing small quantities of highly differentiated products, often on a very compressed timetable, are quickly becoming an absolute necessity in many fields of manufacture.

There have been various attempts to reduce or eliminate the need for single-purpose tooling. For example, U.S. Pat. No. 4,865,796 (Tamura et al.) discloses a technique for forming elongate members for automobiles. The method includes the steps of extruding the material with constant cross-section, continuously removing materials so as to vary the cross-section in the longitudinal direction, and cutting the materials in predetermined lengths. This has the advantage that there is no need for molds or for combining separately formed parts, but is limited to shapes that can be formed by the removal of material from a constant profile of extrusion. There is no provision for longitudinal curvatures.

U.S. Pat. No. 4,770,017 (Yamashita et al.) discloses a technique for forming plates into double-curved shapes. The technique relies on bending and stretch-deformation induced by passing the plate through an entrance roll, flexible rolls, and exit rolls. The flexible rolls can assume various profiles to give transverse curvature while the three sets of rolls are adjusted vertically to control longitudinal curvatures. Again, this technique has the advantage that there is no need for approximating dies or manual heating and bending to final shape, and it develops smoother surfaces than shapes which are repeatedly punched or hammered. However, multiple passes are required for deeply-drawn complex surfaces, and the flexible rolls require numerous wheels with rim shapes which must be varied to form a wide range of plate contours.

U.S. Pat. No. 4,755,334 (Grimm et al.) discloses a molding apparatus that provides some flexibility and ease of adaptation compared to standard molds or dies. Specifically, belt-mounted mold segments form a mold cavity with opposing mold segments or a continuous facing. Thus, it is possible to mold complex shapes of any length, and the mold segments can be rearranged or substituted to mold various shapes. However the segments have fixed contours, requiring a stock of mold segments for each shape. Moreover, the precise mating of mold segment edges is difficult to achieve if the complex contours of the shape extend beyond a single mold segment.

U.S. Pat. No. 4,749,535 (Matsuda) discloses a technique using constant cross-section extruded thermo-plastic material which is introduced into a contoured molding roll, rapidly cooled, and cut to length. This is a simple apparatus for producing compound-curved shapes with a single forming surface that does not require pressure or vacuum apparatus for thermoforming. However, the formed shapes cannot have longitudinal concavities because extruded material would bridge such concavities in the forming surface, and the rotating roll which bears the forming surface must be scaled to the size of the desired shape, drastically limiting the shape range of a particular molding roll. Thus, the prior art techniques have either yielded to the need for fixed tooling, or have escaped such need at the cost of being unable to form complex shapes.

SUMMARY OF THE INVENTION

The present invention provides a computer-controlled process and apparatus for generating complex shapes in a single continuous operation without the use of dies, molds, or other fixed tooling. The invention further provides a technique for analyzing and modifying a shape, and for developing process control instructions from computer models or CAD representations of desired shapes. The shape-generating process may be applied to a single homogeneous material in a stretch-deformable, shear-deformable, or fluent state, or to a commingled or layered mix of materials types, constructions, or combinations in which separate elements or portions may be differentially moved or shaped.

In brief, the present invention contemplates providing a continuous length or flow of a malleable or fluent material to a forming apparatus, which shapes the material and then stabilizes it to produce a contiguous series of smoothly-blended, properly contoured portions of the desired shape. The formation and stabilization of the shape rely on continuously controlling the instantaneous cross-sectional dimensions of the shape in a virtual transition surface, while simultaneously controlling the rates-of-change of the cross-sectional dimensions of the shape, the instantaneous angle of movement of the material at any point on the cross-section, and the rates of generation (rates of movement away from the transition surface) of the stabilized portion of the shape at any point on the cross-section.

A unique advantage of the process is a near-instantaneous stabilization of the formed shape, no matter what the material. The stabilization ensures that no broad-area support is necessary to prevent deformation of the shape. For instance when shaping a thermoplastic material, stabilization is achieved by chilling the surfaces below the material's softening temperature, thereby preserving the imparted dimensions while the material is cooled through its entire thickness.

In one class of embodiments, the relative motion is derived by having the stabilized material in motion and the forming apparatus stationary; in a second set of embodiments, the molding apparatus moves while the stabilized material remains stationary. In yet a third class of embodiments, both the stabilized material and the forming apparatus may move or be stationary at different times in the shape-forming cycle. While a given apparatus for carrying out the present invention is not capable of generating every possible shape, a particular apparatus is capable of generating a virtually limitless number of shapes within certain broad overall constraints.

The invention overcomes limitations of the prior art and has significant new advantages. Besides eliminating time and cost factors associated with fixed tooling, the invention greatly facilitates the design and prototyping stage by allowing single shapes to be produced at a cost no greater than for mass production. Other advantages are best seen by comparison with specific prior art in plastics and composite forming processes, although the range of applications for the invention goes far beyond these. Sheet forming embodiments of the invention make obsolete prior processes for medium and large-scale sheet thermoforming. Apparatus incorporating the invention can accept sheet feed directly from an extruder, avoiding the necessity for reheating or for elaborate handling apparatus to adapt intermittent forming processes to the extruder's continuous output. The manufacture of paneling, housings, boats, vehicle underbodies and other medium-to-large shell structures by thermoforming processes is therefore a field which the invention can dominate.

The invention contemplates embodiments for molding of hollow structural or functional components. This contrasts with blow molding or rotational molding where dies must be made in two or more separable parts, and so are inherently more complex than thermoforming dies, yet are advantageous because of their abilities to form single-part hollow bodies. The invention not only eliminates the need for dies; it offers the further advantages of creating indefinitely long hollow shapes such as ducting, with varying cross-sections and many nonplanar curves. Such shapes would require near-impossible size and complexity in multi-part dies, whether for blow or rotational molding. Also, in blow molding the challenge of laying a parison into a large complex die entails robotic movement of an extrusion head to achieve uniform control of wall thickness and a low waste factor. The invention has the unique advantage of allowing the creation of continuous, complexly-curved, variable cross-section, hollow shapes in place. A mobile system incorporating the invention could integrate continuous ducting or paneling right into a building, an aircraft, a ship, or other large structures.

The forming of high-strength structural elements and panels is another field in which the invention offers the significant advantages of no fixed tooling and a capability to form long, complex shapes. Since the introduction of polymeric-matrix fiber composite materials some decades ago, the standard methods for producing shapes have involved the matched-die stamping of pre-impregnated reinforcement materials, the hand or automated layup of reinforcing fabrics and matting followed by resin wetting, the spraying of a mix of fibers and resin, and other such methods which all rely on dies or forms. Besides the above advantages, the invention would also offer unique capabilities for creating long, complex shapes from the new class of high-temperature thermoplastic-matrix composites. Heating of a relatively narrow band of the material just prior to shaping would reduce the risks of degrading it, and would aid the efficient use and recycling of the energy employed in heating.

The invention also offers a unique new capability to create structures in which a variety of materials and components are merged into a continuous, integrated form. For example a composite sandwich construction might be shaped, in which thermoplastic facings, over a reinforced material with a high-strength thermosetting matrix resin, hold the shape while the matrix resin cures. Further, the sandwich might include piping, wiring and ducting, with all these components being fed from rolls and coils, and being brought together just prior to the forming process. Discrete components such as sensors and actuators might also be merged with the other materials and components prior to forming, and so be merged seamlessly into the resulting integrated structure.

Bending stresses, especially compressive forces within the materials being shaped, are avoided or greatly minimized, and the methods of applying smoothly-varied continuous shaping forces allow the forces to be kept to the minimum values required for working with particular materials or materials combinations. Therefore the control elements which interact with materials in the shaping operations may often be lightly constructed, may exert very moderate forces, and are relatively inexpensive to manufacture and operate as compared to prior apparatus.

As will be seen, the smoothly varied control of shaping forces is especially valuable for generating structures from viscous or viscoelastic materials such as polymeric materials above their glass transition temperatures. A moderate reduction in the forming process rate may reduce the shaping forces required by one or more orders of magnitude. The resultant economies in the structural and power requirements for the forming apparatus may be easily appreciated.

A further understanding of the nature and the advantages of the present invention may be realized by reference to the remaining portions of the specification and the drawings.

BRIEF DESCRIPTION OF THE DRAWINGS

FIGS. 8A–B are perspective and partial front views of a hollow body former which shapes an extruded thermoplastic tube;

FIGS. 9A–C are a perspective view and two schematic side views of a thermoplastic sheet former with a simple linear-orthogonal movement of the exiting formed shape in relation to the cross-section dimensioning mechanism, and schematic side views of the apparatus at various points in a forming sequence;

FIGS. 10A–B are a partial perspective view and a partial side view of a flexible-structure former with yet another variation of the cross-section dimensioning mechanism, while FIG. 10C is a perspective view of a cut portion of the formed structure;

FIG. 15 is a schematic view illustrating the constrained-spring principle used in certain spline assembly embodiments;

FIGS. 16A–D show a spline assembly using compressed springs;

FIGS. 17A–D show two variants of a spline assembly using pressurized tubes;

FIGS. 20A–G show an embodiment of a stabilizing element in which a flexible containment chamber is carried by an internal spline and encloses flexible footing elements.

DESCRIPTION OF SPECIFIC EMBODIMENTS

Shaping Process Introduction—FIGS. 1A–G

The invention is expressed in a continuous, dynamic shaping process. The coordinated movements of final control elements (those interacting directly with the formable materials) impart a continuous series of predetermined, instantaneous cross-sectional dimensions and slopes to the material being shaped. Each infinitesimal "slice" of the formed material experiences a cessation of shaping forces in that same instant. The result may be seen as a formed body which is created at a transition surface, with the dimensioned and oriented cross-sectional elements of the body going from a formable state to a stabilized state as they exit the surface.

Figure 1A:
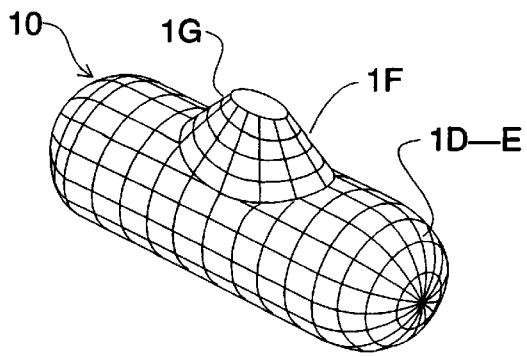
FIGS. 1A–G are schematic perspective and side views of a moving body and a surface tracing array, which aid in showing basic motion relationships between a continuous cross-section dimensioning mechanism and the material being formed.
Figure 1B:
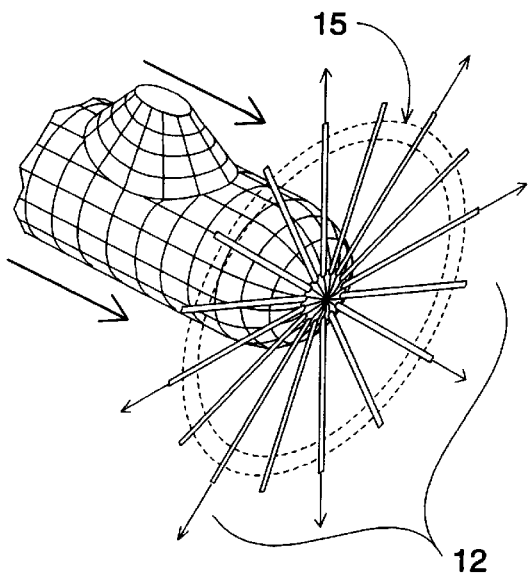
Figure 1C:
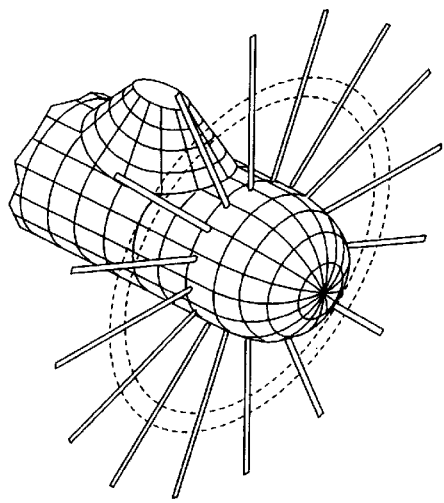

FIG. 1A shows an already formed body 10 which might be created with the invention. The varying contours of the body make it necessary not only to develop a series of cross-sections of the shape, but also to control the rate at which they are developed. FIGS. 1B–C show the existent body and a hypothetical surface tracer which, though not an aspect of the invention, will contribute to an understanding of the dynamic variables which a forming process utilizing the invention must control.

FIG. 1B shows the body 10 moving linearly and beginning to enter an array of tracing rods 12, the inner tips of which will slide along the surface of the body. FIG. 1C shows the body having entered the array. The rods move radially in or out in a vertical planar surface 15 which is transverse to the direction of movement of the body.

Figure 1E:
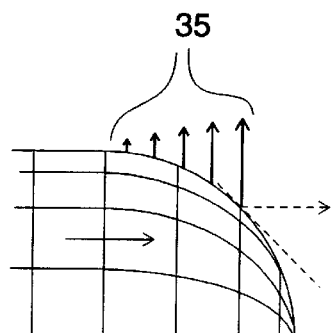
Figure 1D:
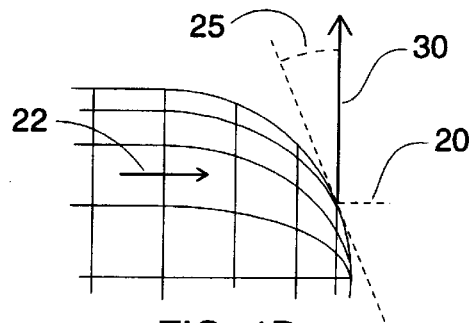

FIG. 1D shows motion vectors at a particular point on the upper midline of the nose section of body 10. A horizontal vector 20 is identical to a motion vector 22 of the body. Angle 25 (22.5 degrees from the vertical) is the slope of the body, while a vector 30 shows the instantaneous direction and rate of movement of a vertically oriented surface-tracing rod at this point. The magnitude of vector 30 is proportional to the tangent of the complementary angle (67.5 degrees) of angle 25 or approximately 2.4 times the magnitude of vector 20. FIG. 1E shows the motion vectors of the tracing rod at several other points along the nose curve. The magnitudes of the rod-movement vectors 35 go from a 1:1 relationship (45 degree slope of surface) with the body-movement vector 20 to a zero magnitude, proportionate as in FIG. 1D to the tangent of the complementary angle.

Figure 1F:
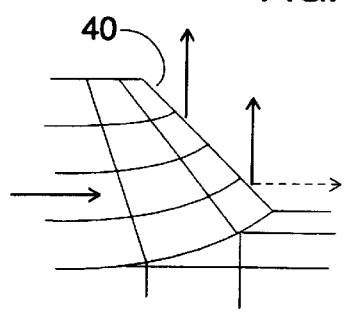
Figure 1G:
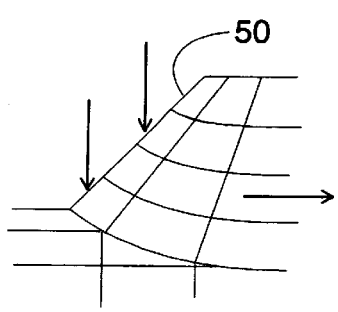

FIG. 1F shows the rod vectors along an upward slope 40 of the body, with a constant 1:1 relationship with the body-movement vector, due to the uniform 45 degree slope of the surface. FIG. 1G shows the opposed yet equal rod vectors along a uniform 45 degree downward slope 50.

To appreciate the invention, imagine the tracing rods 12 being replaced by variable-rate linear positioners. The motions of the positioners are computer-controlled and emulate the tracing rod motions of FIGS. 1A–G. The positioners act upon a mechanism which recreates the series of instantaneous cross-sectional dimensions of body 10. The mechanism acts in turn upon a continuous length or flow of material, imparting instantaneous predetermined dimensions and slopes to an increment of the material's surface, at which instant the shaping process on the increment ceases. Referring again to FIG. 1D, imagine that vector 20 shows the movement of material through the cross-section dimensioning mechanism, while vector 30 shows the movement of the mechanism. The instantaneous slope of the surface being formed would depend on the resultant of the motion vectors 20 and 30, as would the instantaneous rate at which the surface is formed. Since the shaping process is smooth and continuous, a replica of this portion of body 10 would be generated as if being created at a transition surface between a formable material and a stable shape.

Shape-Generating Principles—FIGS. 2A–G

The process relies on simple principles for the continuous forming of shapes. FIGS. 2A–G embody these principles in five conceptual elements: a virtual body 60, an axis of generation 65, a transition surface 70, an instantaneous cross-section 75, and an actual body 80.

Figure 2A:
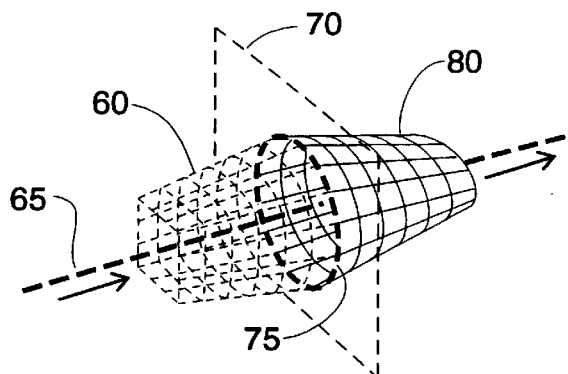
FIGS. 2A–G are schematic perspective views of forming-related conceptual elements and generated shape examples, both of which aid visualization of the forming principles underlying the invention.

In FIG. 2A, the virtual body moves through the transition surface, becoming the actual body. The instantaneous cross-section lies in surface 70 and exemplifies the continuous, smoothly varying series of cross-sections which exist at the moment of transition. The axis of generation is situated at the center of the bodies and guides them in a particular orientation towards and away from the transition surface. In this instance the movement is linear and the orientation is constantly perpendicular to the surface.

Figure 2B:
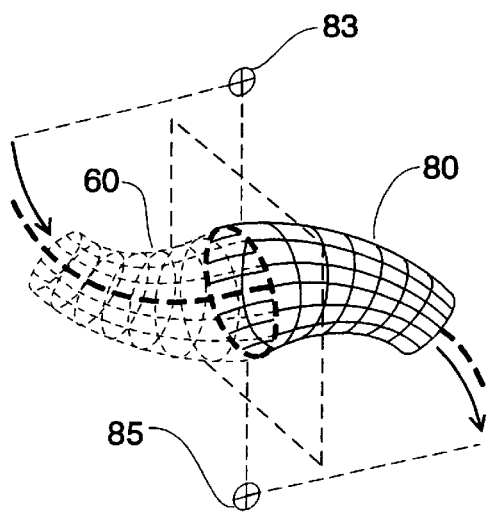

FIG. 2B shows a curvilinear axis of generation at the center of virtual body 60 and actual body 80. Body 60 is moving towards the transition surface as if rotated about a point 83, while body 80 is moving away from the surface as if rotated about a point 85. Although orientations of any particular points on the bodies are continuously changing in relation to the surface, the axis of generation is always perpendicular at the moment of intersection with the surface.

Figure 2C:
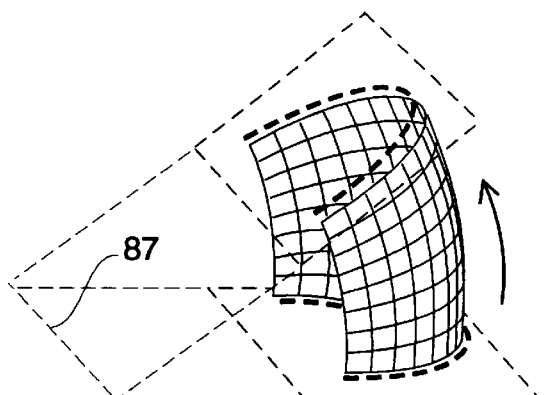
Figure 2D:
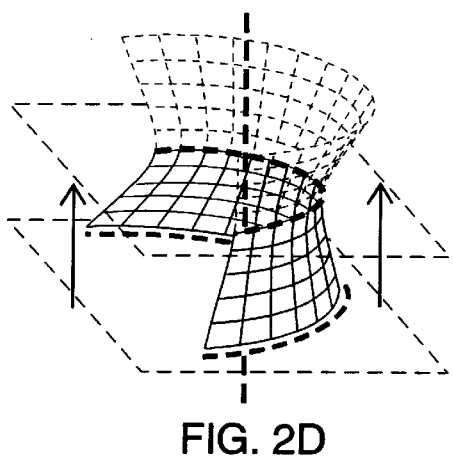

In FIG. 2C a stationary actual body is created by the rotation of the transition surface about a line 87 (the stationary virtual body and axis of generation are not shown). FIG. 2D also shows the creation of a stationary actual body from a stationary virtual body, in this instance with a linear, nonrotating movement of the transition surface vertically upward.

Figure 2E:
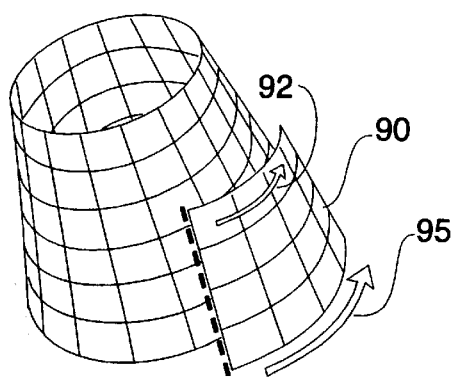
Figure 2F:
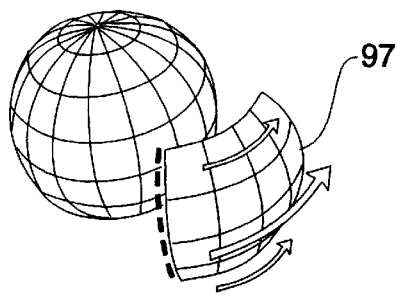
Figure 2G:
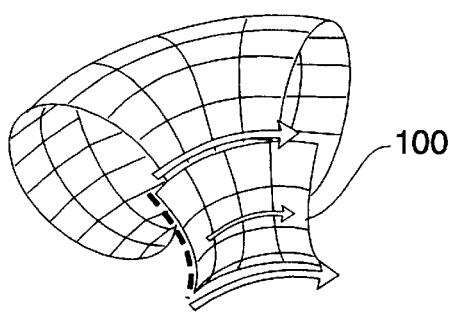

FIGS. 2E–G show the creation of three classical surface forms from which any shape can be composed. FIG. 2E shows a parabolic (or developable) surface 90 which is formed by differential rates of generation between the top and bottom edges as indicated by arrows 92 and 95. FIG. 2F shows an elliptic (or synclastic) surface 97 formed by progressively greater rates of generation from the top and bottom towards the center. FIG. 2G shows a hyperbolic (or anticlastic) surface 100 formed by progressively greater rates of generation from the center towards the top and bottom edges. It can be appreciated that sharp surface curvatures, such as those of a cube's edge and corner regions, are merely extreme examples of these surface forms.

The examples of shape generation in FIGS. 2A–G are but simple expressions of the forming principles which underlie the invention. For instance an axis of generation may comprise a complex series of non-intersecting three-dimensional curves. Likewise a virtual body may incorporate complex contours and curvatures. Finally a transition surface may have three-dimensionally variable properties like a rubber sheet, so that the varying instantaneous cross-sections, generated by its movement relative to the axis of generation, may have three-dimensional curvilinear properties.

Method for Shaping Materials—FIGS. 3A–G

The invention implements these shape-generating principles in a process which relies on a specific method for shaping formable materials. The method consists of continuously and instantaneously stabilizing incremental portions of a length or flow of a formable material as a set of shape-determining variables are brought to predetermined values so that the just-stabilized portions become additions to the formed shape. The stabilization consists of changing the state of a material from a formable state to a fixed state which resists further deformation, or of ceasing the application of deforming forces on a material which then holds the imparted dimensions.

The shape-determining variables are controlled in relation to a virtual transition surface at which the materials go from a formable condition to a stabilized state. These variables are: the instantaneous cross-sectional dimensions of the material in a transition surface, the rates-of-change of the cross-sections, and the angles of movement and differential rates of movement of any portion of the formed material in relation to the transition surface.

Figure 3A:
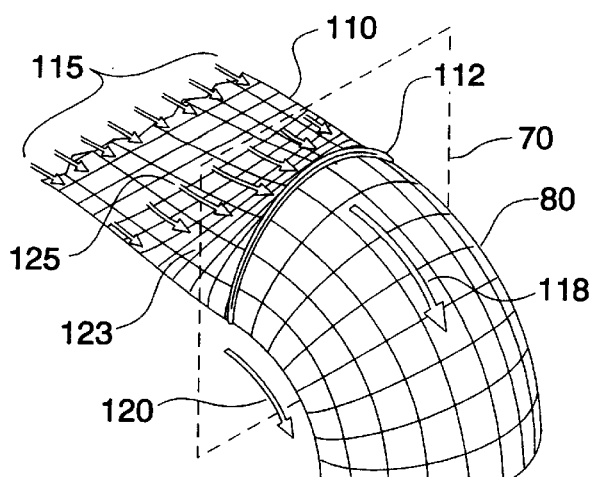
FIGS. 3A–G are schematic views of three embodiments of a specific forming method employing the invention.

FIGS. 3A–G schematically show the method as employed in three significant embodiments of the process. The same reference numerals are used to refer to functionally corresponding elements in the different embodiments. In FIG. 3A a sheet of heat-softened thermoplastic material 110 passes through a cross-section dimensioning mechanism 112 which resides at, and moves in the plane of, a fixed transition surface 70. As the material crosses the transition surface it is instantaneously stabilized, so becoming an incremental addition to the formed and stabilized body 80. As the material approaches mechanism 112 it is initially moving at a constant speed across its width as indicated by arrows 115. Body 80 is moved away from the mechanism at a varied rate along its transverse dimensions, with the maximum rate at the center as shown by arrow 118 and with the minimum rate at the edge, as shown by arrow 120, which matches the initial constant speed of sheet 110. As the material is in a continuous sheet, the forces on body 80 are transmitted to the stretch-deformable region 123. The differential rate of movement of body 80 results in the varying stretch-rate in the material at 123, as shown by the arrows 125.

Figure 3B:
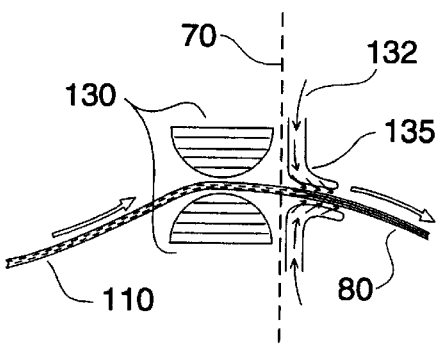

FIG. 3B is a schematic expanded section view of mechanism 112 which is represented by a pair of material guides 130 and chiller elements 135. Material 110 is positioned by the guides and is immediately stabilized as it exits the guides by the flow of a cooling fluid 132 through elements 135 and against the opposed surfaces of the material, creating the formed body increment 80.

Figure 3C:
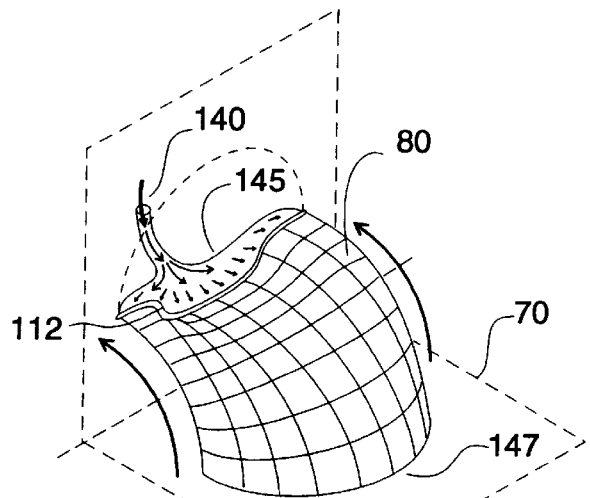
Figure 3E:
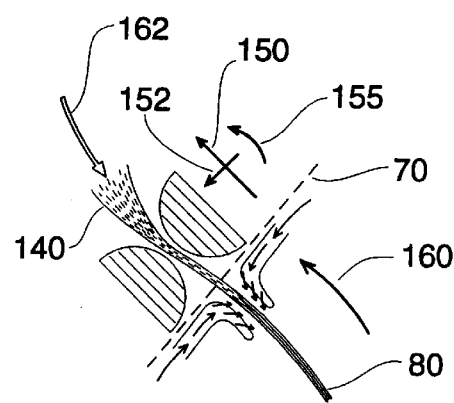
Figure 3D:
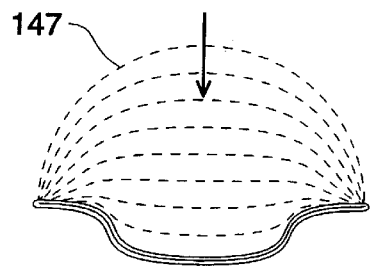

In FIG. 3C a liquified thermoplastic material 140 is delivered through a manifold 145 to mechanism 112, again represented by material guides and chiller elements. The mechanism has rotated through space while smoothly changing, as shown in FIG. 3D, from profile 147 to the mechanism's final profile. The formed body 80 is extruded in place by chilling material 140 as it exits the mechanism. The schematic section view of FIG. 3E shows the dynamics of the forming process. Mechanism 112 is simultaneously translating as shown by vector 150, moving parallel to transition surface 70 (vector 152), and rotating (vector 155). The resultant of these motions is shown by vector 160. Simultaneously material 140 is delivered at a velocity 162 which matches that of resultant 160 so that the stabilized exiting body portion 80 has no absolute motion. Incidentally, if the mechanism in FIG. 3A had changed through the range of profiles shown in FIG. 3D, the exiting (moving) formed shape would resemble the formed-in-place shape of FIG.

3C. The relative motions between the formed material and the cross-section dimensioning mechanism determine the contours of the shape, rather than the absolute motions of either.

Figure 3F:
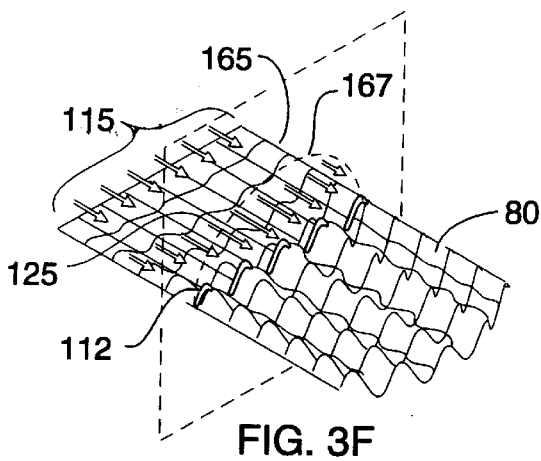
Figure 3G:
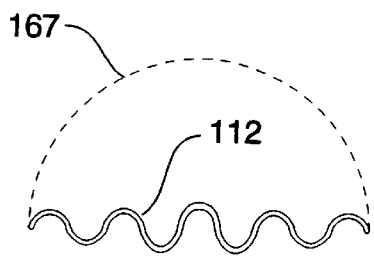

FIG. 3F shows a flexible stretch-deformable material 165 being shaped to the dimensions of the body in FIG. 3A. Rather than assuming the actual shape of the desired cross-section 167 of the body being formed, the material is differentially stretched across its transverse dimension by mechanism 112, as shown in FIG. 3G, into a variably corrugated configuration. At the same time the material is pulled through the mechanism, as in FIG. 3A, at a differential rate 125 which increases towards the center, resulting in a differential stretch rate, and resultant differential dimensions in the longitudinal or material-movement direction, in exiting body 80. When the flexible material of the body is smoothed out, it resembles the synclastic body of FIG. 3A. Similarly, if the mechanism progressively emulates the local dimensions (though not the shape) of the range of profiles shown in FIG. 3D, the exiting body would, when smoothed out, resemble the body of FIG. 3C.

Thus it can be seen that shaping methods which might appear very dissimilar, and which are applied to diverse forms of materials, are actually a single method implementing the same shape-generating principles. Likewise, the specific embodiments described below may seem dissimilar, yet will be seen to rely on the same method and principles.

Figure 4A:
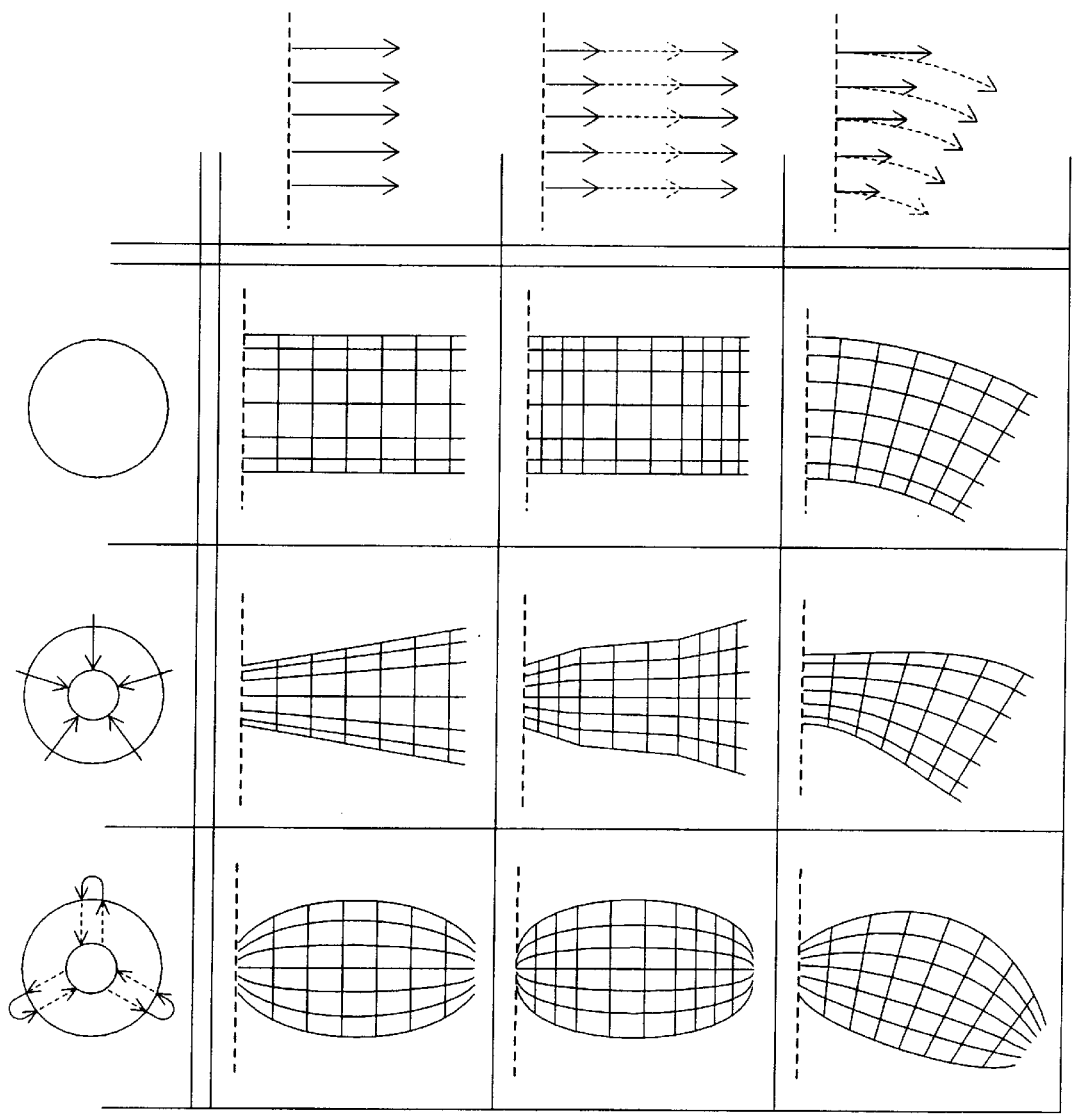
FIGS. 4A–B are diagrams which further elucidate the dynamic relationship between a cross-section dimensioning mechanism and material being formed.
Figure 4B:
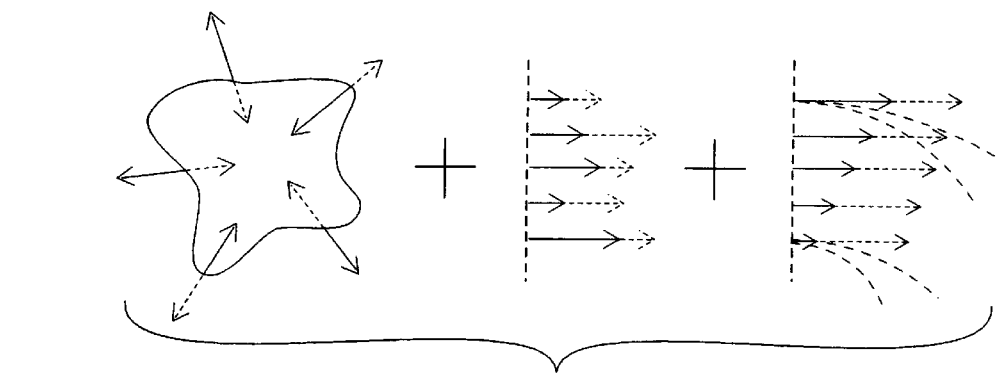

Shape Generation As A Function Of Material Motion And Cross-Section Control—FIGS. 4A–B FIG. 4A is a table which schematically shows examples of the relationship between the cross-section in the transition surface, the exiting material motion, and the shape being generated. The upper row of the table indicates three varieties of exiting material motion, starting from the left: a uniform orthogonal motion, a uniformly varying slow-fast-slow orthogonal motion, and a differential orthogonal motion with the same velocity gradient as would be achieved by rotating the exiting material about a pivot point below and in the plane of the transition surface. The second motion case might also be described as a time-referenced or differential temporal motion, while the third motion case is a space-referenced or differential spatial motion. The left column shows three behaviors of the cross-section in the transition surface. At the top is an unchanging or constant cross-section; next is a cross-section shrinking at a constant rate; and at the bottom is a cross-section which initially expands at a slowing rate, reverses direction, and then shrinks at an increasing rate. The second case is one of constant temporal change, while the third case is one of differential temporal change.

The upper left exiting shape, generated at a uniform rate, is cylindrical with a constant cross-section identical to the cross-section in the transition surface. The second exiting shape in that row is identical to the first, though it was generated at a uniformly varying rate. The third exiting shape is generated as a figure of rotation, in this case a torus segment, also with a constant or unchanging circular cross-section. The shape is formed as if rotating about a pivot point, with the inner circumference smaller than the outer circumference. Every infinitesimal cross-sectional "slice" of the shape is wedge-shaped, with the thicker portion at the top. This is so because there is a minimum rate of exiting material movement at the bottom of the figure, creating a minimum length of material per unit of time at that point, with progressively greater lengths of material exiting in the same unit of time towards the top of the figure.

The leftmost shape in the next row is conical, with the cross-section changing from a maximum to a minimum size during the forming interval. The constant rate of cross-sectional change, coupled with the constant uniform exiting rate, produces linear slopes on the figure. The second shape in the row is bell-like, due to the varied forming rates (slow-fast-slow material movement). The slopes are again linear, because the exiting material rate is constant between speed changes. However the beginning and ending slopes are more steeply inclined than in the central region of the shape, since the slope of the shape at any point is a resultant of the rate of material movement and the rate-of-change of the cross-section. The third shape in the row ("rotary" material movement) has a horn shape, being in effect a composite of the toroidal segment above and the conical shape.

The leftmost shape in the last row has maximum slopes at the ends, since the rate-of-change of the cross-section is greatest at these points. The rate-of-change decreases towards the center of the shape as does the slope, with zero rate-of-change and zero slope in the instant that the cross-section stops expanding and starts shrinking. The second shape (slow-fast-slow material movement) has steeper slopes towards both ends than the first, since the material is exiting at a slower rate at the beginning and end of the forming interval. Towards the center, the forming rate and rates-of-change of the cross-section are the same as in the first shape in the row, giving the shapes identical contours in these regions. The last shape ("rotary" material movement) again has composite characteristics, although not so recognizably, of the first shape in the row and the toroidal segment above.

Since a significant advantage of the invention is its ability to produce complex shapes with a wide range of contours, both the cross-section in the transition surface and the exiting material rates must be freely varied within constraints of the shape-generating principles and method described. The slopes or contours of any shape are directly determined by the resultant of the motion vectors of the cross-section determining mechanism and the material, with the resultant being definable at a virtual transition surface. The invention accomplishes this by establishing a predictable geometric relationship between the transition surface and the mechanism, and by providing control of the rate and direction of movement of material at the transition surface.

FIG. 4B schematically shows the variables preferred for processes of the invention. The first segment of FIG. 4B represents a freely-varied cross-section, with the rate-of-change in any direction likewise freely variable. The second segment represents variable control of the exiting material rate at any point on the cross-section. While orthogonal motions away from the transition surface are shown, implementations of the invention need not directly control the material direction. As will be seen in the embodiments, the angle to the transition surface can be developed as a function of the cross-sectional rates-of-change and the material movement rates.

The third segment represents an exiting material motion with a variable velocity gradient which emulates rotation of the whole body of exiting material about a variable pivot point. This virtual pivot point may not only change its distance from the center of the cross-section in the transition surface during the forming interval; it may also rotate about the cross-section in the plane of the transition surface. Implementation of this freely-variable pivot point concept will become clear in the apparatus descriptions to follow.

Other variables may be considered for continuous forming, such as non-orthogonal relationships between the transition surface and the exiting shape, or non-planar motions and curvatures of the cross-section dimensioning mechanism during the forming process. However the variables of FIG. 4B, in conjunction with a planar cross-section control and transition surface, allow the generation of a wide variety of shapes. As such they serve as the bases for control of the shaping processes in most of the examples to follow.

Figure 5:
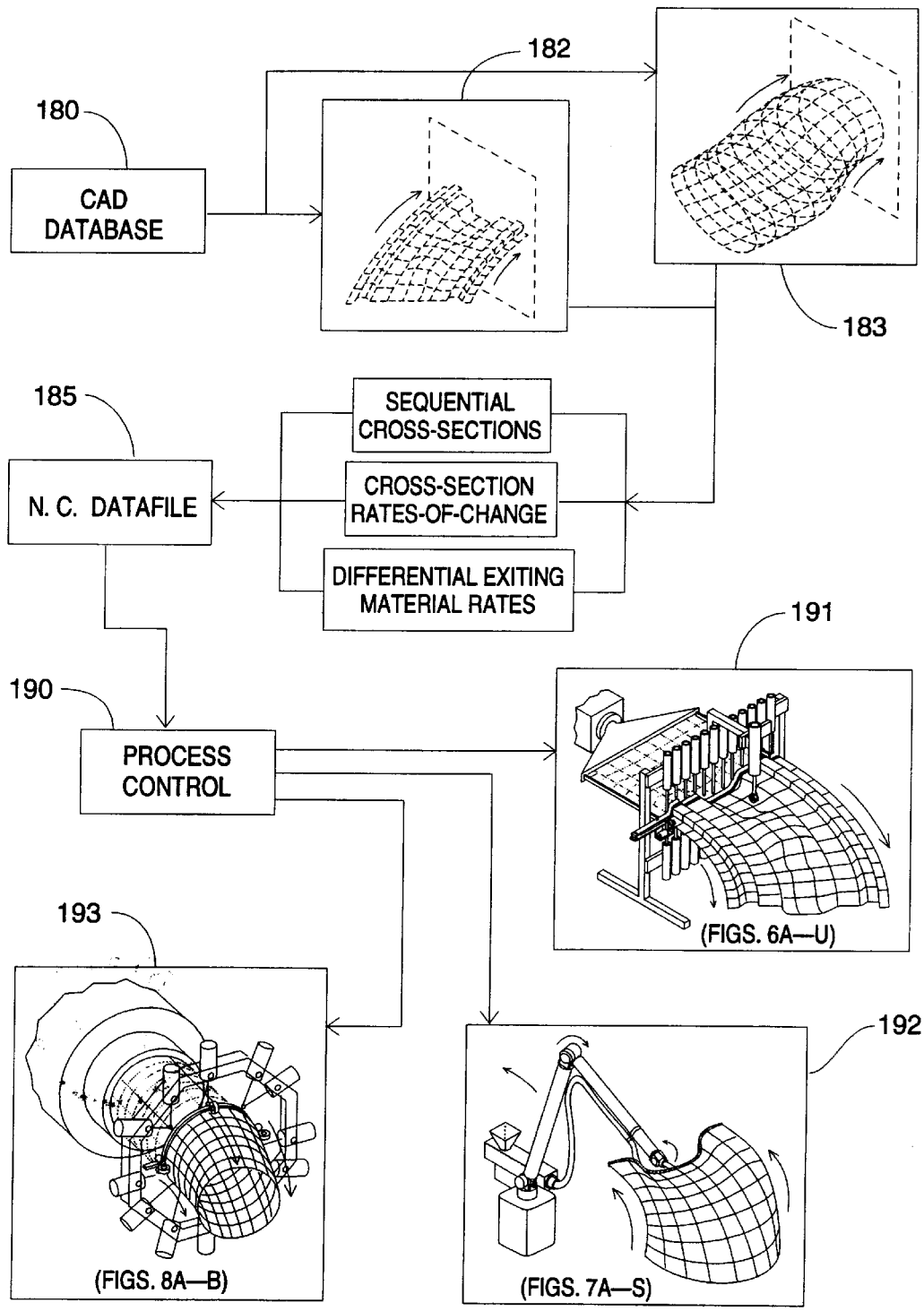
FIG. 5 is a process overview chart indicating the elements and sequence of operations of continuous forming systems incorporating the invention.

Process Overview—FIG. 5

FIG. 5 is a diagram showing an arrangement of elements and sequence of operations which exemplify continuous forming processes utilizing the invention. A three dimensional virtual representation or "CAD model" of the shape is taken from a database, analyzed to determine formability of the shape, modified as necessary, and used as the basis for generating sequential numerical instruction sets for the parallel operation of control elements in a forming system.

Starting with a CAD database 180, the sequence proceeds to a computerized analysis (represented by two pictorial segments 182 and 183 of the diagram) of the shape. Part of the analysis might be performed by a workstation operator and part automatically, depending on complexity of the CAD model, need for modification, and computer program capabilities. A generally planar complex shape is shown, as well as a complex though generally tubular shape, as they might be displayed while undergoing a sequential analysis of intersections with a transition surface. The model must satisfy forming constraints on the rate of cross-sectional change, differential rate of movement through the transition surface, and shaping forces required for candidate materials. If, for example, some angles on the shape are too extreme, the operator might change the contours of the model and subject the modified regions to a second analysis.

Proceeding on, the CAD model is processed to develop sequential instructions for process control elements. There are at least three variables which the shaping process must control. These are 1) a sequential series of cross-sections defining the shape, 2) the continuous rate-of-change from one cross-section to the next in the series; and 3) rates of movement of formed material relative to the cross-section in a transition surface. As will be seen in specific embodiments, a fourth critical variable, the slopes, angles, or directions of movement of material at the instant of transition, can be a function of the dynamic variables 2) and 3). The instructions are accumulated in a numerical-control (N.C.) datafile 185, which is used by a process controller 190 to control the continuous forming process.

The lower three pictorial segments, designated 191, 192, and 193, of the diagram show examples of computer controlled forming apparatus utilizing the invention. Segment 191 (to be described below in connection with FIGS. 6A–U) shows an extruded sheet material being shaped by a stationary cross-section determining mechanism which is variably curved by a transverse parallel array of linear positioners. The formed shape is supported, oriented, and pulled away from the mechanism by drive wheels which engage the shape at the edges and in the center. Segment 192 (to be described below in connection with FIGS. 7A–R) shows a fluent material given shape by a variation of the cross-section dimensioning mechanism which is integrated with a resin-dispensing manifold and resin-flow controller. The mechanism is moved through space by a continuous-motion multi-axis positioner so that the formed and stabilized portion of the shape remains stationary. Segment 193 (to be described below in connection with FIGS. 8A–B) shows a tubular extrusion being shaped by a cross-section determining mechanism controlled by a circular array of pivoting linear positioners.

Figure 6A:
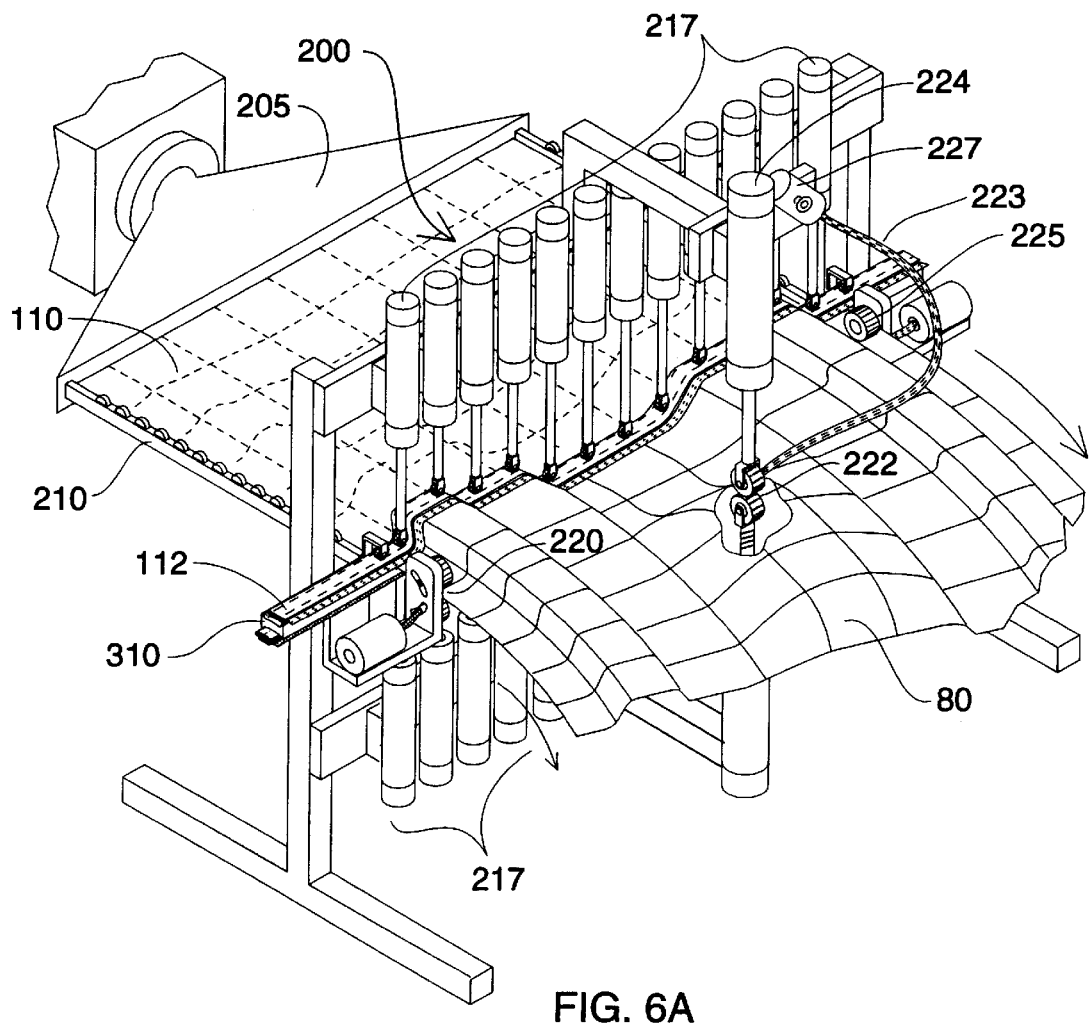
FIG. 6A is a perspective view of a thermoplastic sheet former with a stationary cross-section dimensioning mechanism from which a shape is generated by controlling the movement and orientation of the stabilized portion of the shape away from the mechanism.
Figure 6B:
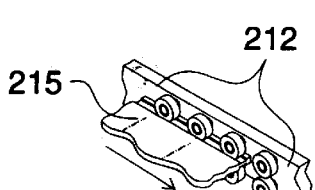
FIGS. 6B–N are assorted detailed views of the cross-section dimensioning mechanism and related elements.
Figure 6C:
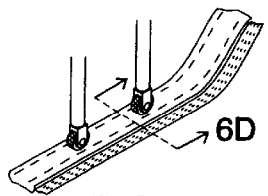
Figure 6D:
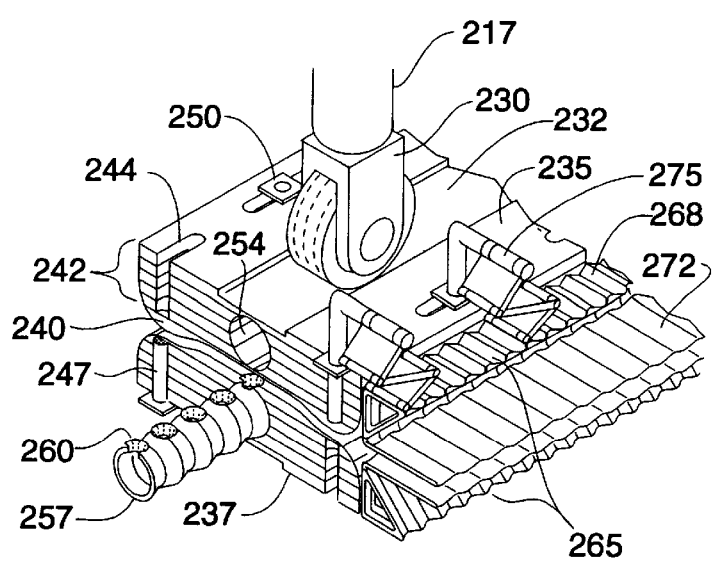
Figure 6E:
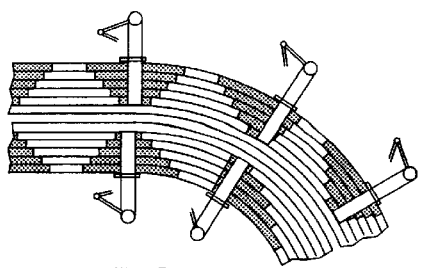
Figure 6F:
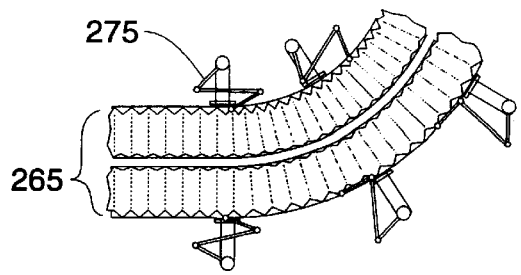
Figure 6G:
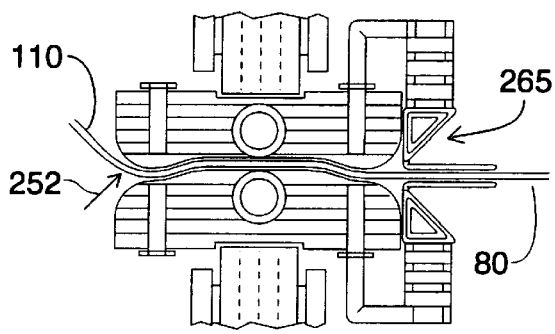
Figure 6H:
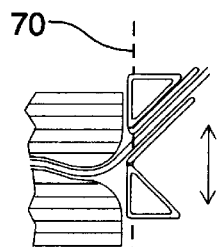
Figure 6J:
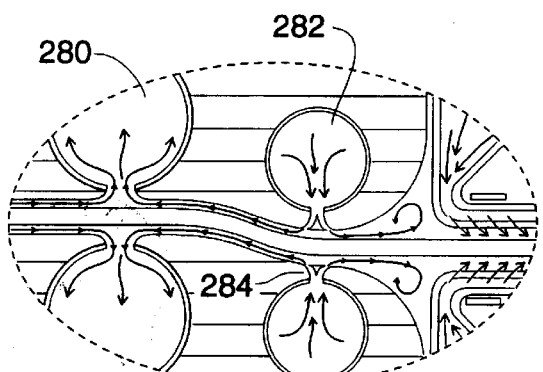
Figure 6I:
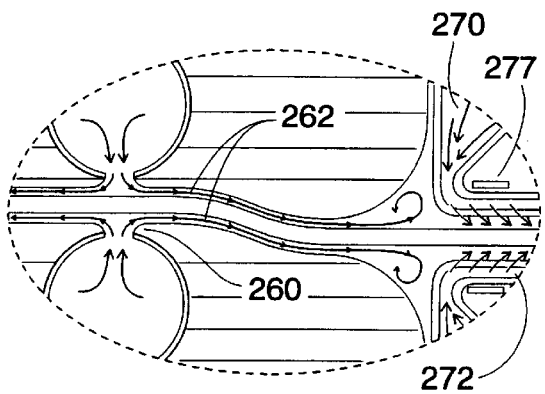
Figure 6K:
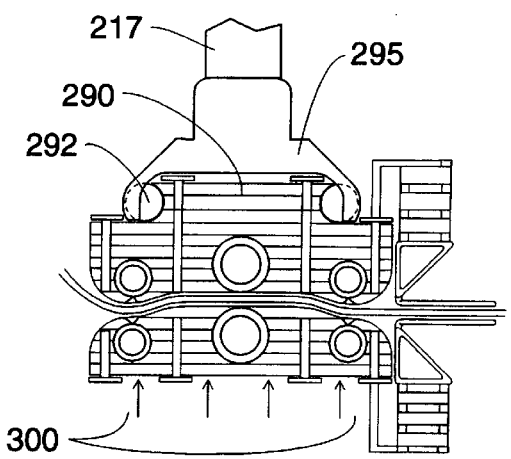
Figure 6L:
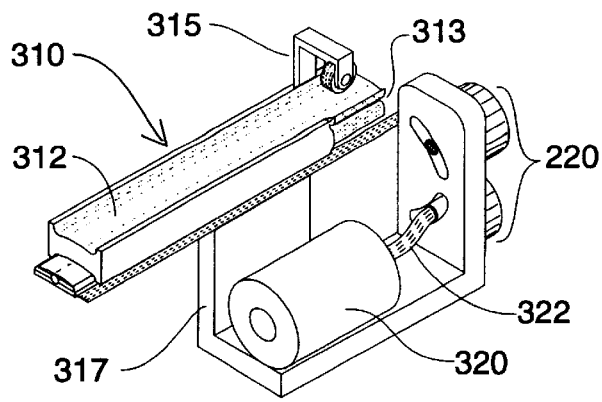
Figure 6N:
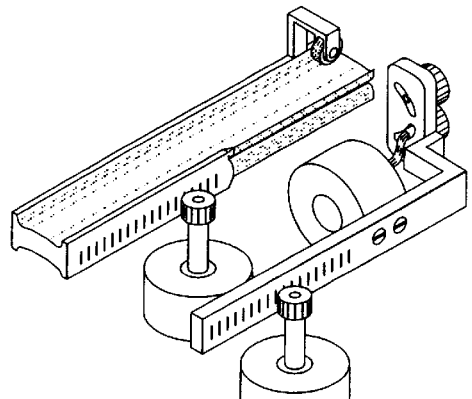
Figure 6M:
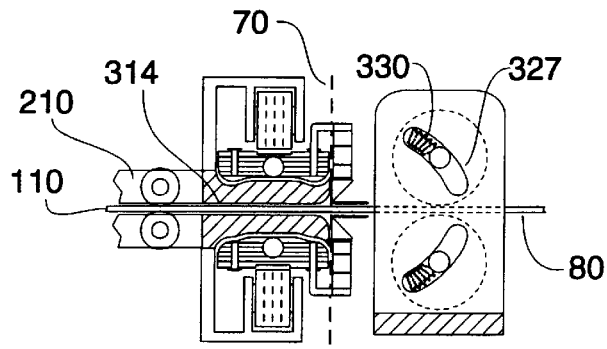
Figure 6O:
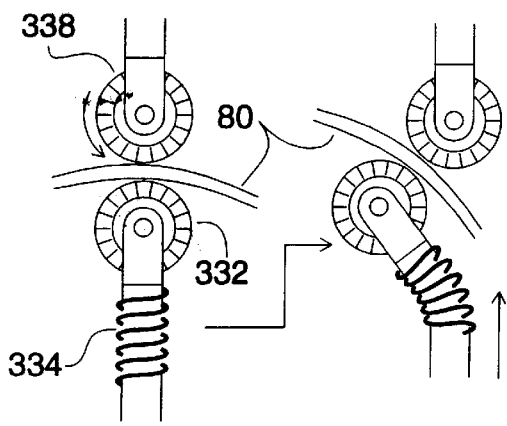
FIGS. 6O–U are assorted views of a drive wheel mechanism which holds, orients, and moves the formed portion of a shape away from the cross-section dimensioning mechanism.
Figure 6P:
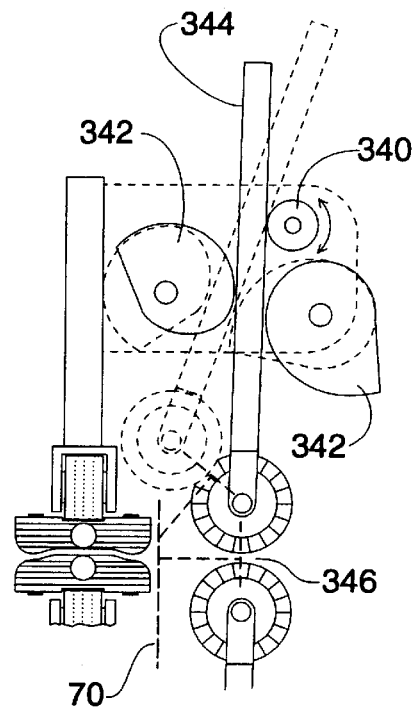
Figure 6Q:
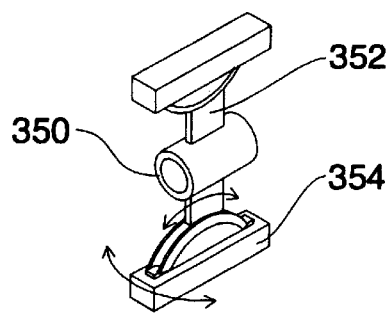
Figure 6R:
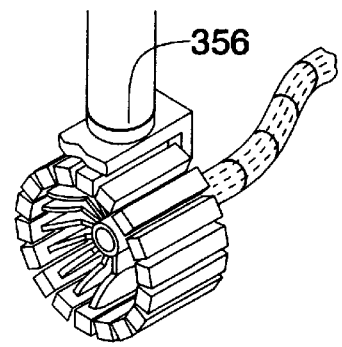
Figure 6S:
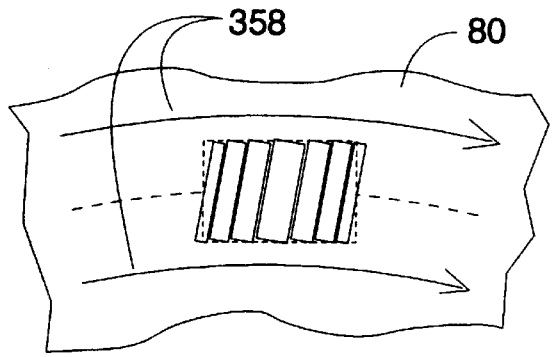
Figure 6T:
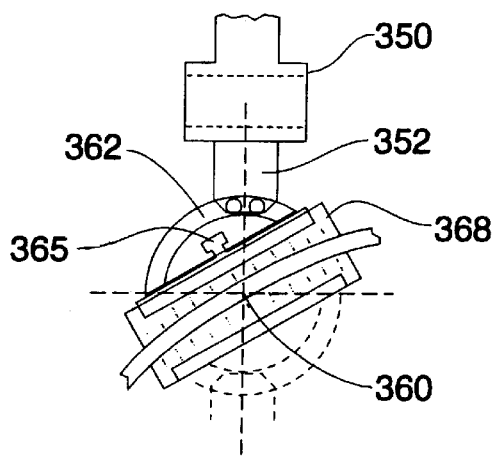
Figure 6U:
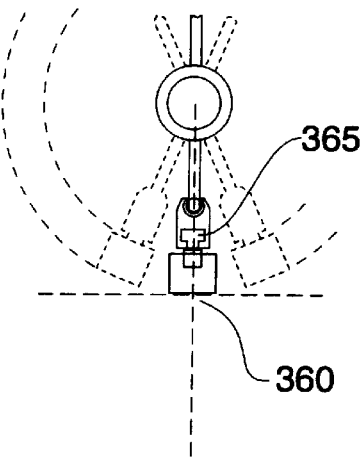

Thermoplastic Sheet Former—FIGS. 6A–U

FIG. 6A shows a thermoplastic sheet former 200. Formable sheet 110 exits an extruder 205 at a high enough temperature to be stretch-deformed, yet at a low enough temperature to be stretched in the motion direction without necking down or breaking loose from the extruder lip. An edge holder 210, a section of which is shown in FIG. 6B, engages the edges of the sheet by indenting it with a wheel train 212. The wheel train cools the indentation to near the material's glass transition temperature so that it is more resistant to deformation, in effect turning an indentation 215 into a stable track in the sheet. Engagement of the indentation in the wheel train prevents sheet 110 from sagging or narrowing as it advances from the extruder to the sheet former, and also offers resistance necessary for transverse stretching of the sheet. If the sheet is thin enough to cool below the forming temperature on its journey from the extruder to the former, the sheet would move through a heated tunnel (not shown) bridging the distance between them. If the sheet tended to sag excessively, whether through elastic or inelastic deformation, a support surface might be provided which levitates the sheet on a thin hot gas cushion (as will be described with reference to FIGS. 6J–K).

Former 200 contains cross-section dimensioning mechanism 112 which is variably curved in a transverse vertical plane by an array of linear positioners 217. Each opposed set of positioners may be moved at variable rates. Sheet 110 passes through the mechanism, being transversely shaped and stretched, and is chilled below its glass transition temperature as it exits. Three sets of exiting-shape drive wheels 220, 222, and 225 engage the formed and stabilized portion of the shape 80, supporting it, orienting it, and transporting it away from mechanism 112. The localized forces exerted by the drive wheels on the stabilized portion are smoothly distributed as tensile forces to the unstabilized portion.

The drive wheel sets (exiting assemblies) may have their rotation rates varied to exert differential spatial pulling motions on shape 80, which results in differential longitudinal stretching of sheet 110 prior to stabilization. Wheel set 225 is shown rotating at a greater rate than set 222, which is in turn rotating at a greater rate than set 220. These differential spatial rates produce the differential horizontal curvatures shown, as if shape 80 is being pivoted about a distant point as it is formed.

Differential temporal motions may also be imposed on the stabilized portion and thereby distributed to the unstabilized portion. For instance the drive wheels might have their speeds individually changed to produce varied horizontal curvatures or have their speeds uniformly varied in concert to change and forming rate. Their speeds might also be uniformly increased to accelerate the reduction of transverse dimensions when the sheet has been transversely stretched by mechanism 112. Tension along one axis tends to go towards equilibrium through biaxial distribution, thereby producing in this instance a reduction in the transverse dimension through an extension of the longitudinal dimension. This latter differential temporal motion might be especially useful if the sheet inelastically deforms and the transverse dimensions need to be reduced in a short spatial or temporal interval.

Finally, the wheels might have their speeds uniformly decreased (while the rates-of-change of mechanism 112 are also proportionately decreased) to reduce tensile forces on the just-formed material. Such a control of forces through temporal control would prevent unacceptable deformation of the formed material prior to developing its highest resistance (by being chilled below the glass transition point through its entire thickness).

Wheel set 222 is also moved up and down vertically, at a variable rate, by a positioner set 224. The upper wheel is driven through a flexible drive shaft 223 by a variable-speed motor 227. The variable-rate vertical motion and variable drive rate permits the wheel set 222 to follow the contours imparted to the shape by mechanism 112. Two or more sets of such moveable wheel pairs may be employed as necessary to handle the weight of shape 80 and to prevent unwanted forces from being exerted on sheet 110 prior to stabilization.

Vertical movement of 222 is also utilized to move the exiting shape vertically relative to the generally horizontal and transverse orientation of the mechanism. An appropriate rate of movement adds a vertical component of simulated rotation about a point. Such a motion, when combined with the simulated horizontal rotary motion of the formed shape induced by the wheel sets, produces a resultant exiting rotary motion of the formed body with a simulated pivot point which can be positioned and moved freely in space relative to the transition surface.

FIG. 6C shows a portion of mechanism 112 and indicates where the view of FIG. 6D, an enlarged perspective cutaway view of the mechanism, is taken. Each of the linear positioners 217 terminates in a wheel 230 which rides in a groove 232 of an upper flexible spline assembly 235, as does an opposed positioner mate with a lower spline assembly 237. The assemblies comprise layers of flexible strips or splines, through-slots 244, retainer pins 247, and pin caps 250. The retainer pins are affixed to inner strips 240 and extend outward to the exterior caps. The confined strips 242 are free to slide past one another as shown in the section view of FIG. 6E, allowing the spline assemblies to assume variable curvatures as determined by movement of the positioners 217.

The inside faces of the spline assemblies are nested so that thrust forces, as exemplified by arrow 252 in FIG. 6G, are born by both assemblies. A lateral center hole 254 in each spline assembly, defined by the inner edges of the confined strips, contains a hot gas manifold 257, attached to strip 240, which vents through a series of openings 260 to the inside faces of the assemblies as shown in FIG. 6I. The gas temperature is maintained at the forming temperature of sheet 10, which is supported on opposed gas cushions 262 until it moves away from the spline assemblies, thereby avoiding friction, sticking or marring of the softened material due to contact with the assemblies.

Appended to the exiting edges of the assemblies are the stabilizing elements 265. Each element consists of a flexible manifold 268 which delivers a cooling fluid 270 through a flexible dispenser 272 and onto opposed surfaces of sheet 110. The fluid instantaneously chills and so rigidizes the surfaces to continuously create stabilized portions of the shape 80 at transition surface 70 (which is shown in FIG. 6H sectional view). The exiting shape may be further chilled to remove residual heat and solidify the material through its entire thickness, as by external water sprays or air jets (not shown). The elements 265 are mounted on double-pin hinges 275 (FIG. 6F) which depend from extensions on the forward retainer pins. The elements are therefore free to follow sheet 110 through varying angles while being constrained to move only vertically rather than moving or flexing in the horizontal direction. FIG. 6F shows a front view of the elements flexing and displacing to follow curvatures of the exiting shape. A variety of flexible stiffeners may be employed to prevent horizontal flexure of the elements between hinge attachment points. For instance a strip 277 (see enlarged section view—FIG. 6I) may be bonded to the upper surface of dispenser 272, or the upper face of manifold 268 may incorporate a multiple-pin hinge following the bellows configuration.

The constrained-to-vertical movement of elements 265 contributes to a predictable planar-curvilinear locus of stabilization (a virtual transition surface) of sheet 110, as does the dispensing of chilling fluid starting at the anterior end of dispenser 272, about which the dispenser pivots. The positioning and rates-of-change of the spline assemblies to attain a predictable location and angle of the sheet at the transition surface can be determined by automatic calculation of relative positions of a reference line (say at the geometric center) for the assemblies and the actual cross-section in the transition plane. The result is an actualization of the transition surface concept which is suitable for numerical control of the forming process.

FIGS. 6J–K show enlarged section views of an alternative mechanism 112. The stabilizing elements are as described above; however the spline assemblies contain a central exhaust manifold 280 and two hot gas venting manifolds 282 near either edge. The manifolds 282 deliver gas through a pair of vents 284, with one directing gas towards the exhaust manifold and the other venting towards the spline assembly edge. A pressure differential between manifolds 280 and 282 results in a flow velocity which reduces the gas cushion pressure to below atmospheric pressure. However the gas cushion is still maintained, since the momentum of the gas carries it in a continuous sheet between the two surfaces (a variation of the Coanda effect). The upper spline assembly is held to the positioner 217 by an attached set of flexible strips 290 (which form a flexible bearing race), ball bearing 292, and a foot 295 with bearing cups. The lower spline assembly is held against material 110 and the upper spline assembly by atmospheric pressure acting against its outer face, as exemplified by the arrows 300. Besides reducing the number of positioners which must be employed, the constant force distribution along the lower spline assembly reduces the likelihood of thinning softened sheet 110 by unintended compression forces. The constant forces would also prevent the spline assemblies from separating between positioner sets under forces imposed by the entering or exiting material.

Alternative positioners might also be employed to more precisely control the curvatures of the spline assemblies. For instance the opposed positioners might be staggered so that those on one side are placed between rather than in line with those on the other side. Also, each positioner might be variably moved transversely to align with points of extreme curvatures or maximum deflections. As a final example spline-engaging wheels 230 might be variably driven so that the spline assembly can be flexed by tension or compression forces between any two adjacent wheels.

FIGS. 6L–M show a spline assembly end guide 310 comprising a fixed guide bed 312 and opposed fixed guide wheels 315. Left and right end guides serve to hold the spline assemblies fixed in relation to transition plane 70 prior to engagement with the positioners 217. Left and right pairs of guide wheels might have opposed reel spring mechanisms to hold the spline assemblies centered as they move in and out in response to changing cross-sectional dimensions. Alternatively the spline assemblies could be attached by a pivoting foot to central sets of positioners.

A bracket 317 is mounted below the end guide and holds the variable-speed drive motor 320, which is connected by a flexible shaft 322 to one of the drive wheels 220. FIG. 6M shows an end view of the components with the motor and bracket 317 removed. The edge of formable sheet 110 passes from edge holder 210 through a slot 314 in bed 312, and between the opposed stabilizing elements 265, turning at the transition surface 70 into the edge of shape 80, which then passes between drive wheels 220. The cutaway 313 in bed 312 allows the stabilizing elements to contact the exiting sheet 80. The wheels 220 are mounted in curved slots 327 and pressed against sheet 80 by a pair of springs 330. The curved slot and spring arrangement allows wheels 220 to passively track the stabilized sheet edge as the vertically moveable wheel set 222 controls the orientation and rotation rate of exiting shape 80. A multiple-component construction of the wheels allows them to track the sheet edge through horizontal curvatures, as will be shown in following figures.

FIG. 6N shows alternative moveable end assemblies which add other degrees of control to the sheet forming process. Together with horizontally-pivoting edge holders 210, these allow the edges of sheet 110 and shape 80 to move in and out. The increased slot depth in the guide bed allows the width of a horizontal flange to be varied. Additionally such horizontal positioning control, coupled with moving of outer sets of the positioners 217 out of contact with mechanism 112, would reduce the necessary amount of transverse stretching of sheet 110 when forming narrow shapes of deep cross-section. Each opposed end guide assembly might also be moved vertically up and down. This, when combined with the horizontal positioning, would allow each of the opposed edges or flanges of a shape to be formed differently and with a great degree of three-dimensional curvilinear freedom.

FIG. 6O shows side views of the moveable drive wheel set 222. The lower wheel 332 is not driven and has a flexible spring section 334 in its supporting shaft. This permits the wheel to passively orient to shape 80 and so remain opposedly positioned to drive wheel 338. FIG. 6P shows an alternative assembly for more precisely controlling the movement and orientations of a drive wheel set. In this case movement of the wheel set is controlled by the actions of a rotary positioner 340 and a cam set 342 on a wheel shaft 344. The cam set maintains a fixed-distance relationship between a wheel tangent point 346 and transition surface 70. Maintaining this relationship obviates the need to compensate for wheel diameter when generating N.C. instructions for the rotary speed and vertical movement of the drive wheel set. Additionally, the precise alignment of wheel tangent points reduces the likelihood of undesired torquing forces on the exiting shape, as would occur if the opposed drive wheels were far from alignment. For the highest degree of precision in driving and orienting the exiting shape, edge drive wheel sets as well as two or more central sets of this type would be employed. Alternative exiting assemblies might also be employed, to augment or substitute for drive wheel assemblies. For instance robotic arms with friction-engaging end effectors might support, orient, and transport the stabilized portion of the shape.

FIGS. 6Q–U show details and operation of a drive wheel. FIG. 6Q shows the wheel's major components, a central axle 350 and spokes 352, each holding a bi-axially orienting foot 354. FIG. 6S schematically shows a wheel driving exiting shape portion 80 which has a horizontal rotary motion component 358. During the interval in which a wheel foot is in contact with the surface the differential rate of motion across its width causes the foot to pivot out of line with the wheel axle as shown. A swivel 356 (FIG. 6R) may also be necessary to allow the plane of rotation of the wheel to align with the angle of movement of the exiting shape portion 80.

FIG. 6T shows an opposed pair of feet pivoting transversely to adapt to the transverse orientation of the shape portion. FIGS. 6–U also show the two-element pivot arrangement which maintains a constant-distance, fixed drive-point 360 between the wheel feet through a wide range of exiting shape orientations. Bearing race 362 has a circular curvature centered on the drive-point. Pivot 365 allows the foot to pivot out of line with the wheel axle. The fixed relationship of drive point 360 to the wheel axle's center assures that the driving radius of the wheel is constant; therefore the ratio between the wheel's rate of rotation and the rate of movement of the driven surface is always constant. Finally FIG. 6T shows a compliant region 368 on each foot which aids the feet in maintaining substantial contact with the exiting shape despite its curvature.

In summary, the stationary transition surface concept of FIGS. 2A–B is actualized through the interactions of spline assemblies, stabilizing elements, and drive wheels contained within the forming apparatus 200. Also, the shaping method of FIG. 3A has been given an explicit embodiment. The spline assemblies shape the material into a sequential series of smoothly varied cross-sections and control the rate-of-change between cross-sections. The stabilizing elements move as if residing in a stationary planar transition surface, chilling and rigidizing the material as it is shaped. Finally, the drive wheels control the rate of movement and orientation of the stabilized portion of the shape away from the transition surface, and so control the rates, differential rates, and angle of movement of material at the transition surface. Further embodiments of the invention will actualize the moving transition surface concept of FIGS. 2C–D, show the fluent material shaping method of FIG. 3C, and show the flexible material shaping method of FIG. 3F.

Figure 7A:
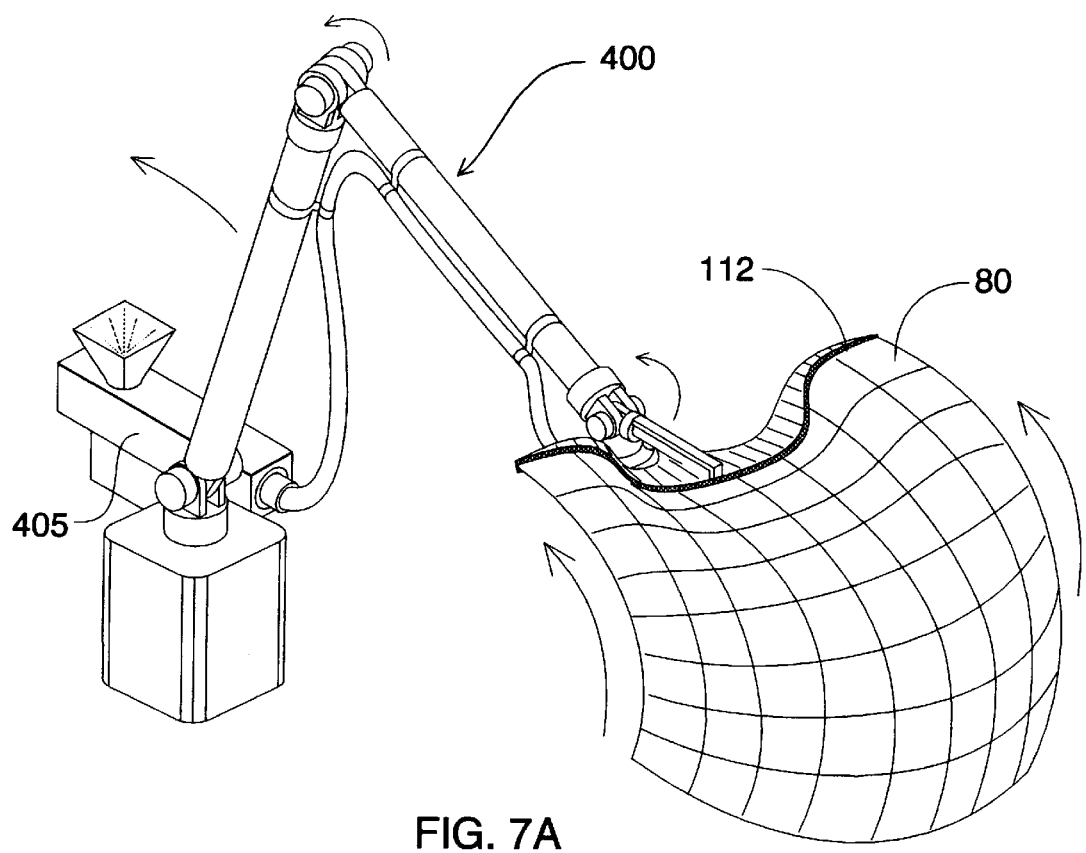
FIG. 7A is a perspective view of a forming apparatus in which the cross-section dimensioning mechanism is moved through space to generate a stationary formed shape from a fluent thermoplastic material.

Extrude-in-Place Former—FIGS. 7A–S

In FIG. 7A a stationary shape 80 is generated by movement through space of a variation of mechanism 112 which is integrated with a resin-dispensing manifold and resin-flow controller. The mechanism receives a thermoplastic liquid from a liquifying extruder 405 and is moved and oriented by a continuous-motion multi-axis positioner 400, describing a rotary motion as shown previously in FIG. 3C, while at the same time undergoing a curvilinear translation as shown in FIG. 3D. The dispensing rate through the mechanism is differentially varied along its curvature so that, at any point, the exiting rate of the resin is equal and opposite to the resultant motion of mechanism 112 at the moment of stabilization through chilling. As a result the material being added to shape 80 is at zero motion relative to the stationary shape, and so has contours which smoothly blend with the shape. The mechanism might also be incorporated in a stationary forming apparatus as shown in FIG. 6A. In such an embodiment the exit assemblies would transport the shape away from the dispenser, matching the rate and angle of movement of the stabilized portion to the rate and angle of movement of the material being formed at the moment of stabilization.

Figure 7B:
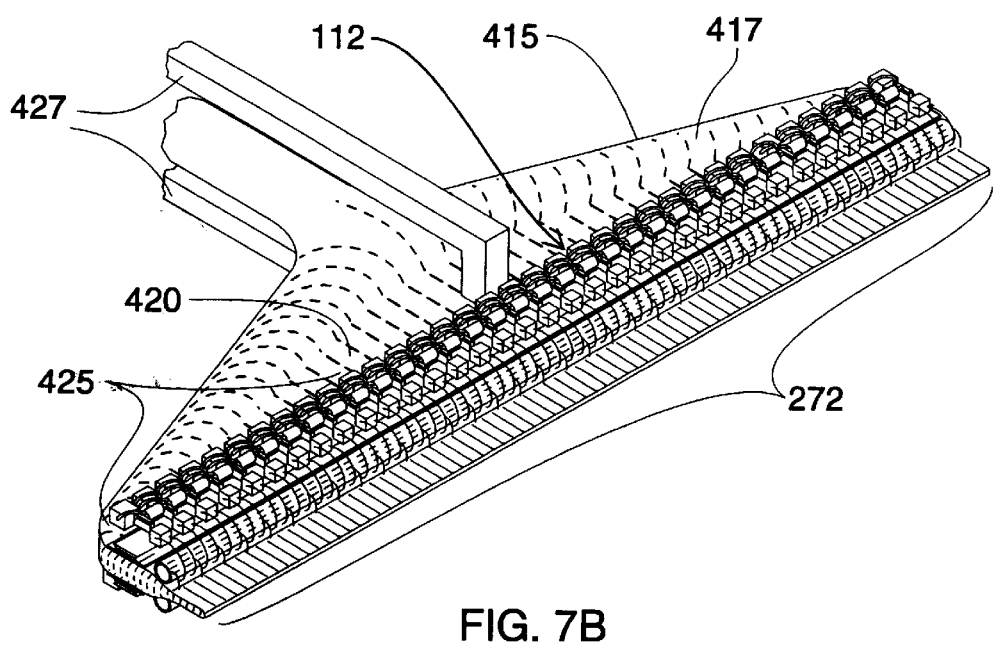
FIGS. 7B is a perspective view of a variation of the cross-section dimensioning mechanism which is integrated with a resin-dispensing manifold and resin-flow controller.
Figure 7C:
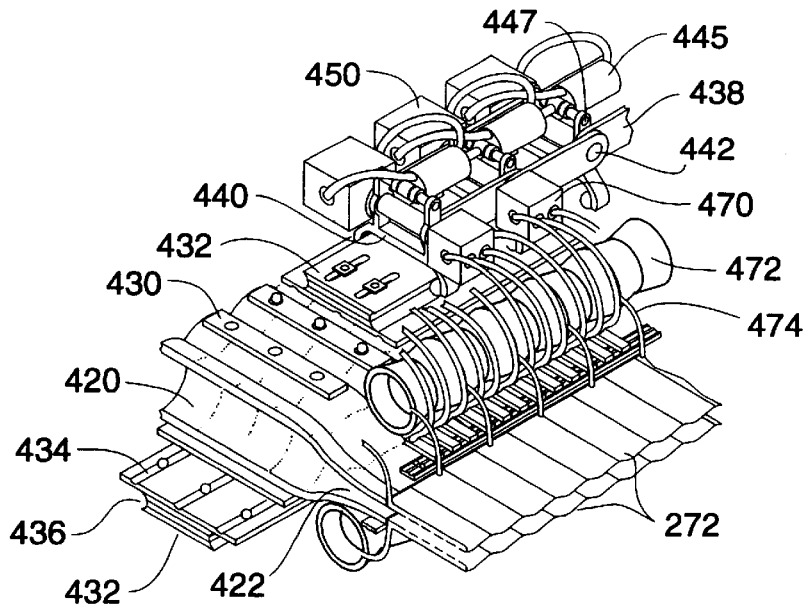
FIGS. 7C–I are assorted detailed views of the mechanism and resin dispenser.
Figure 7D:
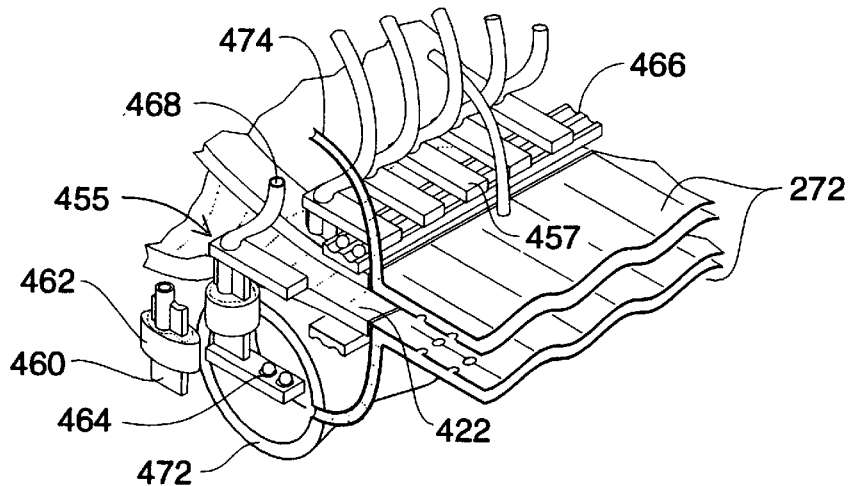

FIG. 7B is a perspective view of the integrated mechanism, while FIGS. 7C–D show enlarged perspective cutaway views of significant components and portions of the mechanism. A manifold element 415 has a corrugated aft region 417 to aid flexure, and a multiply-tubular frontal region 420 which necks down to an exiting slot 422, to which is attached a stabilizer (chilled fluid dispenser) 272.

A curvature-controlling assembly 425 is mounted on a pair of booms 427 and comprises the following elements. A ball bearing retaining strip 430 (FIG. 7C) is bonded to opposed outer faces of each tube element of region 420.

Opposed spline assemblies 432 are composed of strips and retainers as previously described, though they differ from these earlier assemblies in having bearing grooves or races 434 on their inner faces and in having the contoured outer edges of the strips define a pair of bearing races 436.

A roller chain 438 interconnects to each opposed spline assembly through a series of brackets and bearings 440 rotating on chain pins 442. The upper arms of each bracket have a pair of hydraulic or pneumatic positioners 445 connected with sleeve bearings to a series of pins 447, which are mounted on the brackets 440. Each positioner is connected to a pressuized fluid controller 450, mounted on the posterior end of each chain pin, which delivers to or exhausts fluid from either side of a positioner's piston.

FIG. 7D shows exiting slot 422 with a series of built-in resin flow-control assemblies 455, each consisting of a pair of opposed exterior brackets 457 and a connecting spine 460 around which is mounted a liquid resin flow-controller 462. Each bracket has nested bearings 464 riding in races on a pair of opposed spline strips 466 which are bonded to the outer faces of slot 422. Each flow-controller consists of a flexible shim-spring sleeve surrounding a bladder which communicates through a tube 468 with a pressurized fluid controller 470 mounted to the anterior end of chain-pin 442. A chiller element comprising a chilled-fluid manifold tube 472, communicating tubes 474, and dispenser 272 is affixed to each lip of the exiting slot.

Figure 7E:
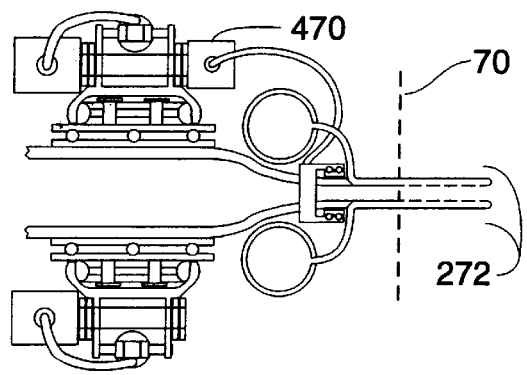
Figure 7F:
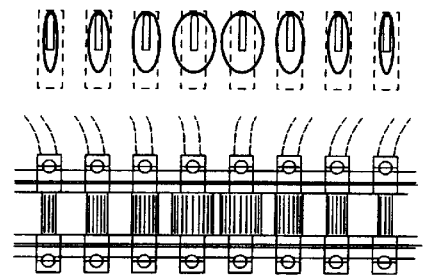
Figure 7G:
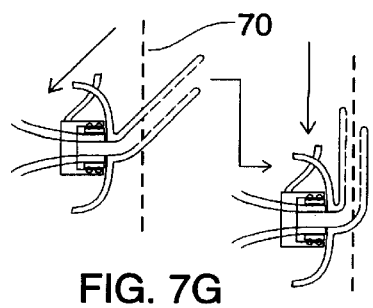

FIG. 7E shows components of the mechanism in cross-section and also the location of transition surface 70, at the point on dispensers 272 where chilled fluid first exits. FIG. 7F schematically shows a top section-view of resin flow-control assemblies 455 and a front view of the controllers blocking resin flow to various degrees. FIG.7G shows a cross-section of the chilled-fluid dispenser flexed into positions determined by the direction of movement of mechanism 112. The horizontal location of surface 70 relative to the mechanism is dependent on the angle of movement of the mechanism in relation to the just-stabilized (and stationary) portion of the formed shape.

Some fluent materials may be formed by a resin-dispensing mechanism which does not have flow controllers in the exiting slot. If the materials are of low viscosity and so can flow under relatively low pressure, the back pressure caused by solidification of the material when stabilized may serve as a locally variable flow control. The chilled fluid dispensers must be able to hold the fluent material to a controlled thickness, i.e. not be susceptible to bulging out or pinching in on the material as it is stabilized.

Figure 7H:
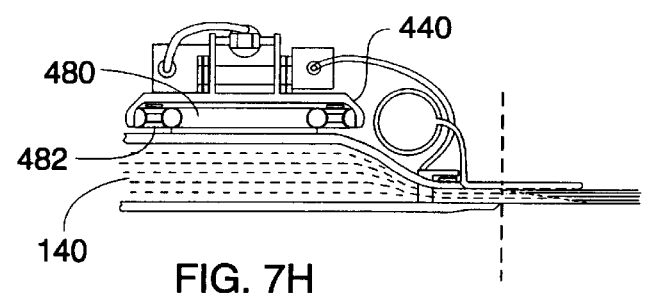
Figure 7:
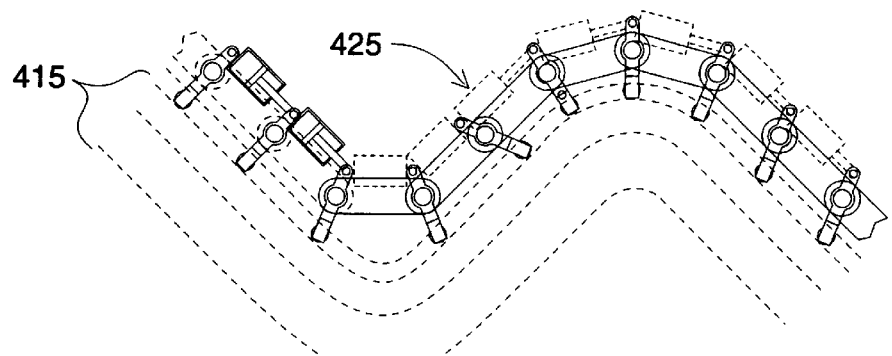
FIGS. 7J–M are assorted views of another variation of the cross-section dimensioning mechanism which is capable of assuming nonplanar curvatures, with a diagram of its operation.
FIGS. 7N–O are side and partial perspective views of a mobile forming apparatus which can generate indefinite-length stationary shapes.
FIGS. 7P–Q are cross-section views of alternative exiting elements of resin-dispensers.
FIG. 7R is a cross-section view of resin dispensers receiving a series of components which are interconnected with wiring and integrated into a permeable core material.
FIG. 7S is a perspective view of an apparatus in which the cross-section dimensioning mechanism rides on the formed portion of a stationary shape.

FIG. 7H shows a variation of mechanism 112 and a dispensing mechanism in which the curvature controlling assembly engages the dispensing manifold from one side only. A bearing retaining element 480, bonded to each tube element as are elements 430 in FIG. 7C, has bearing cups on the anterior and posterior ends. A pair of continuous spline assemblies 482 have bearing races defined along anterior and posterior faces, along which bearings held in the cups of element 480 and brackets 440 are free to move as curvatures are imposed on the manifold. The exiting resin 140 is chilled on one side only.

FIG. 7I schematically shows curvature controlling assembly 425 imposing extreme curvatures on (dotted lines representing) manifold 415. There are many factors which determine the minimum radii which can be formed across transverse dimensions of a shape. These include flexibility of spline assemblies, positioner size and extensibility, flow controller spacing and dimensions, conforming capabilities of the stabilizing elements and the like.

Figure 7J:
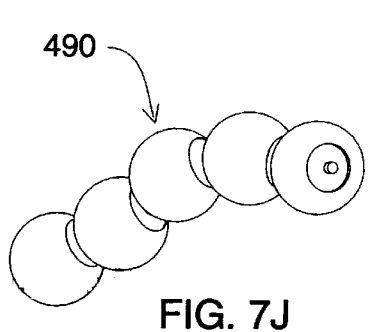
Figure 7K:
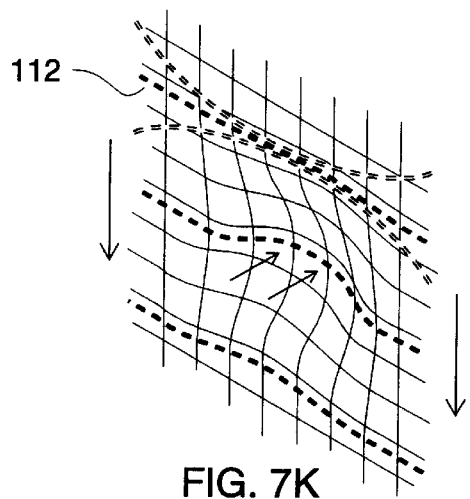

FIG. 7J shows a ball-chain segment 490 which replaces roller chain 438 in an alternative curvature controlling assembly with nonplanar curvilinear capabilities. FIG. 7K diagrammatically shows a variation of mechanism 112, with nonplanar curve-assuming capabilities, moving vertically downward to form a shape. The mechanism is free not only to flex in the plane of motion as shown at top; it may also curve laterally to form the bulge or undercut shown in the middle of the figure. The virtual transition surface associated with the mechanism is also nonplanar.

Figure 7L:
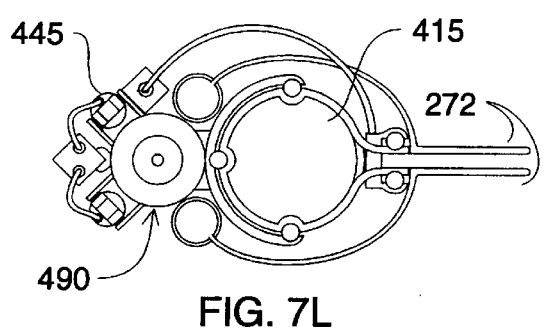
Figure 7M:
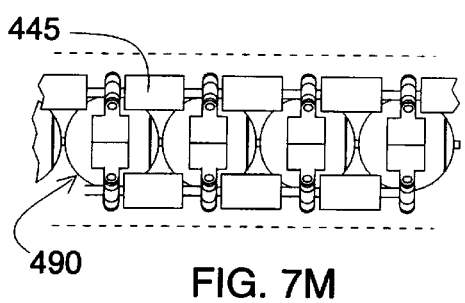

FIG. 7L shows a cross-sectional view of the mechanism, while FIG. 7M shows a partial rear view. The positioners 445 are mounted in angled pairs on twin brackets attached to each ball section of chain 490. The positioners connect to the brackets with ball pivots rather than pin and sleeve pivots, and so can assume non-planar relationships with one another as each positioner independently extends or contracts. The resin manifold 415 is circular in cross-section so that it may flex in any direction, and the dispensers 272 have a very flexible structure which has progressive transverse extensibility towards the ends. Such properties in the dispensers are necessary to allow them to flex to extreme angles, and can be achieved by a waffled or corrugated construction.

FIGS. 7N–O show a mobile forming system capable of generating an indefinite-length shape 80. A pair of opposedly mounted mechanisms 112 are variably moved and oriented by a multi-axis positioner on a directionally controlled cart 410. The twin mechanisms may have the capability to form two separate shapes or a single hollow shape in two sections.

FIG. 7P shows two opposed manifolds with a slight variation from that of FIG. 7H. The inner lips are shortened, and the chilled fluid dispensers are shaped so as to urge opposed streams of resin into contact before being chilled. The opposed manifolds are shown (dotted partial figures on right) initially moving vertically towards one another, creating vertical portions which are merged into a single portion of a shape as the dispensed resin streams contact one another and the manifolds move in concert horizontally.

FIG. 7Q shows an opposed pair of manifolds with another slight variation, in that the resin streams are dispensed towards each other. The resins flow into a permeable core material 495 to create a composite exiting sheet structure 80. The core material can be configured into a deformable sheet which is variably stretched by tension developed between the stabilized portion of the shape and tensioning rolls which precede the dimensioning mechanism. A differential relative motion is produced between the entering sheet and the exiting sheet, which is embedded in stabilized resin, resulting in a forming method similar to that of FIG. 6 though with the dimensioning mechanism (and associated transition surface) in motion.

The core might contain multiple components or materials. FIG. 7R shows a series of components 497, interconnected with wiring and integrated with a permeable core material. The local flexibility of the resin manifold allows the components to move through the mechanism, while localized curvature control permits flexure across the transverse dimension of the mechanism to conform to the components. The resin flow may be turned off across the body of the components yet embed their edges, while resin delivered from the underside permeats the core material and anchors the component firmly in the core material as the resin solidifies.

These integrated dispensing and dimensioning mechanisms might also have more than one curvature control assembly. For instance if highly viscous resins are to be dispensed, high pressures in the flexible manifold might necessitate a powerful curvature controller which acts on the anterior portion of the manifold. This controller might have few positioners and merely approximate the curvatures, with an additional fine curvature control assembly such as 425 mounted on the forward portion of the manifold.

FIG. 7S shows a forming apparatus with a variation of mechanism 112 which does not rely on the multi-axis positioners 400 shown in FIGS. 7A and 7N. Instead the mechanism is carried by a set of drive wheels which ride on the formed portion of a stationary shape. Depending on the complexity of shapes to be formed, these drive wheel sets might simply pivot on supports extending from the mechanism and rotate against the formed shape under spring pressure. For a higher degree of control, a multi-axis adjustment capability might include moving the wheel supports on two axes while angling and rotating the drive wheels to follow complex contours.

Summarizing, the moving transition surface concept of FIGS. 2C–D is actualized, and the fluent-material shaping method of FIG. 3C is embodied. A mechanism 112 receiving fluent material is moved through space by a multi-axis positioner, or alternatively is carried and oriented by a set of drive wheels which ride on the formed shape. The exiting material has its velocity variably controlled across the dispensing slot of a manifold by local flow controllers, at a rate that opposedly matches the rate of movement of the dispenser so that the formed portion of the shape is stationary. Alternately the exiting material has its velocity controlled by the back pressure of the just-stabilized portion of the shape. A chilling element or elements stabilize the material as it exits the dispenser, in effect creating a transition surface. The exiting angle of the fluent material in relation to the transition surface is guided, at the moment of transition, by flexure of the chilled-fluid dispenser as it follows the curvatures of just-stabilized portions of the shape.

Further Examples of Apparatus—FIGS. 8–10

FIGS. 8A–B show a thermoplastic hollow-body former 500 which produces seamless shapes. The extruded tubular feedstock is engaged by a variation of cross-section determining mechanism 112 from the outside only. The spline assembly of the mechanism consists of the top spline assembly of the mechanism shown in FIGS. 6J–K, with the material held against the mechanism by atmospheric pressure. The angles which can be imparted to the exiting material are limited by the tendency of the material to pull away from the mechanism more readily than from a double-element mechanism. The minimum circumference of a formed body would depend on the capability of the tubular extrudate to be necked down by tensile forces, unless the extruding apparatus has a significant variable-diameter capability.

FIG. 8B shows a passive inner assembly 505 which presses against and supports the material from the inside, but only at the opposed regions where the outer spline assemblies come together as they bend around the end guide wheels. The material separates from the outer assemblies as they curve around the wheels (being pulled away by elastic forces within the material) and is supported from within on a hot gas cushion as previously described. Spline-type inner mechanisms, held against the inside of the material and the outer spline assemblies by a pressure differential as in the FIGS. 6J–K, might also be used in conjunction with the assembly 505, being carried on slides so that they evert along the assembly. Alternatively, control elements could be mounted on the front inner face of the extruder die to control an inner cross-section determining mechanism. There might also be an inner dispensing mechanism to inject filler materials like foams inside the shape as the exiting material is stabilized.

To create long shapes with extensive curvatures, the dimensioning assembly and extruder might be variously moved and oriented while the formed portion of the shape is being simultaneously transported. This capability would reduce the need to swing the formed portion through an ever-greater volume of space as it lengthened. The same capabilities could be embodied in a forming apparatus incorporating a fluent material dispensing and dimensioning assembly.

FIG. 9A shows a sheet former 515 in which the exiting shape has a simplified motion, being moved linearly at a constant rate. Complex curvatures may be developed by variable rates-of-change of the cross-section determining mechanism; however the shapes will lack "whole-body" curvatures which emulate rotation of the exiting material about a point, and will have planar flange or edge regions. FIGS. 9B–C schematically shows mechanism 112 moving "downstream" (FIG. 9B) at the same rate as the feedstock to facilitate forming steeply inclined portions of the exiting shape, and then moving back "upstream" (FIG. 9C) during periods of little dimensional change.

A moving shuttle 525 (FIG. 9B) may facilitate forming by further heating the sheet or pre-forming it with the "corrugating" deforming method shown in FIGS. 3F–G (and further described below with reference to FIGS. 10A–B). Such a method might be employed in the longitudinal (material movement) direction as well as in the transverse direction, to give further dimensional control of the preform. These capabilities would be of advantage especially for the forming of extreme contours in materials which require substantial deforming forces, such as fibrous thermoplastic composites. The shuttle might also be used to minimize the amount of material which is deformed as mechanism 112 transversely stretches the sheet. FIG. 9B shows the shuttle closer to the mechanism at a point of extreme dimensional change in the formed portion of the shape in a small time interval. FIG. 9C shows the shuttle further from the mechanism at a point where there is little dimensional change. The shuttle might be moved even further from the mechanism as the sheet is transversely stretched to increasingly greater dimensions without the need to return quickly to reduced dimensions.

FIGS. 10A–B show a flexible-structure former which bonds two deformable facings 540 to a series of vertically-oriented, transversely-disposed flexible ribbing strips 545. The cross-section dimensioning mechanism radically differs from the curvature-assuming mechanisms previously shown, instead consisting of an array of deforming elements 550. The individual elements move deforming rollers 552 vertically to locally-variably stretch the facing materials across the ribbing strip guides 547. The wheels of rotary drive elements 560 variably stretch the facing materials and ribbing strips in the longitudinal or material-movement direction, and then bond facings to ribs, stabilizing the construction. The bonding point for each rib lies in a virtual transition surface as previously described; however in this case the transition surface is nearly reduced to a fixed line, since the planar array of drive wheels are fixed in location. A portion of the resulting "I-beam" sandwich construction is shown in FIG. 10C. The shape may be pressurized, filled with liquids, or filled with a curing foam material to form a permanent structure. The spaces in the construction might also contain components which are fed in between the ribs as the shape is formed.

In this embodiment the forming process is limited to flexible materials. The exiting shape 80 is held in a planar corrugated configuration at the moment of transition, while its final shape may have complex three-dimensional curvatures. An advantage of the process is that the materials do not have to be guided into the actual series of instantaneous cross-sections as required with rigid materials; therefore a flexible spline-type dimensioning mechanism is not required. Also, extremely high deforming forces can be imposed on the materials due to the multiplicity of drive and deforming elements in a simple planar array.

A narrow former of this type would be capable of generating very wide structures by adding formed material in successive passes to already formed materials. The former could be moved relative to the formed portion of the shape in a simplified linear constant-speed motion while controlling complex shaping variables. Additionally, such a simple former could be used to create preforms for use in a conventional process such as (cavity-mold based) resin transfer molding, or to preform a material for the resin-permeating process shown in FIG. 7U. A fibrous matting might be shaped, generally holding the dimensions imparted to it at the instant that deforming forces cease. Alternatively the matting could have a thermoplastic binder which is heated for forming and then chilled to assure more precise and stable dimensions of the preform until its use.

Figure 11:
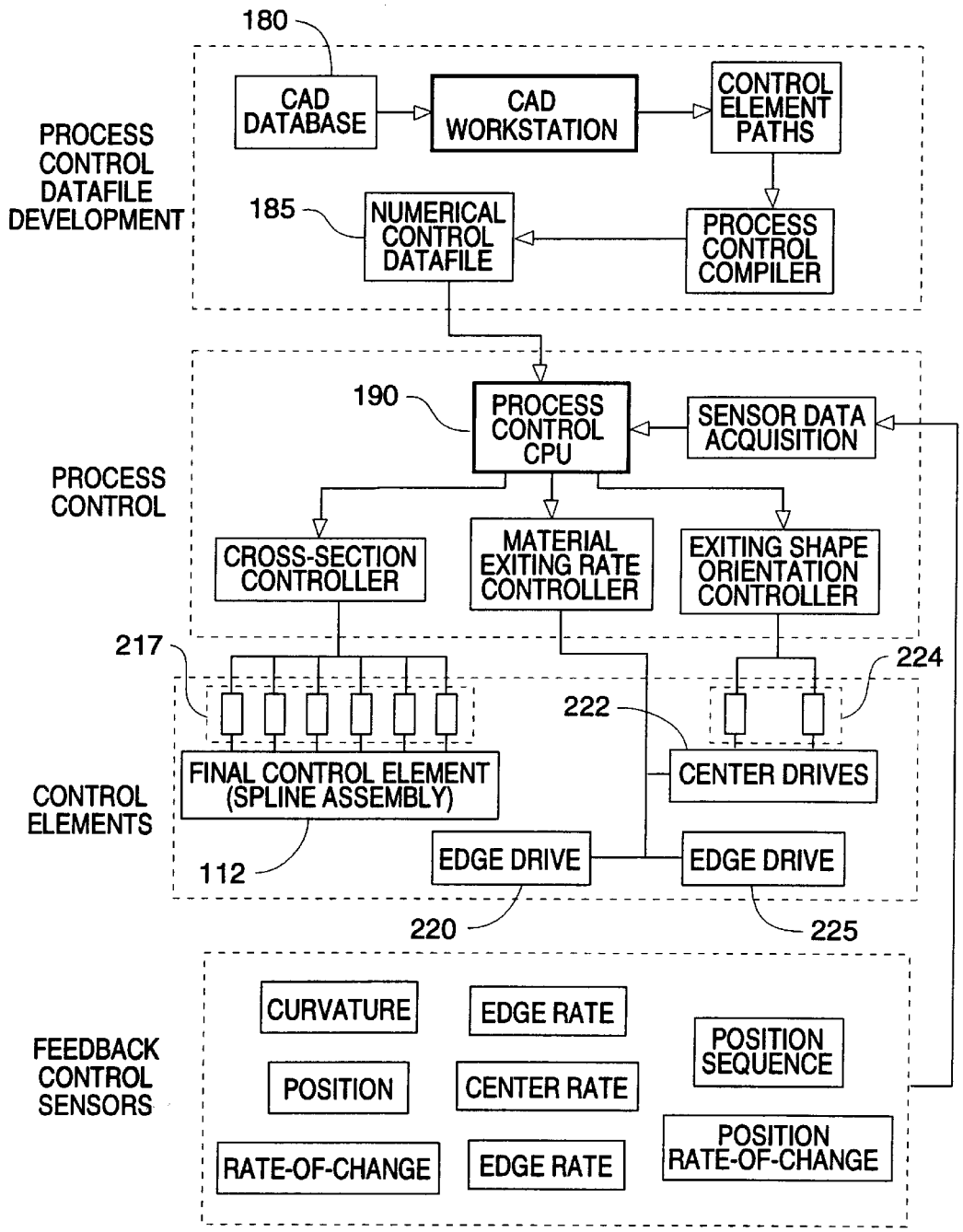
FIG. 11 is a block diagram of a system incorporating the sheet thermoforming apparatus of FIG. 6A.

System Block Diagram—FIG. 11

FIG. 11 is a detailed block diagram corresponding to the high-level view of FIG. 5 for a system incorporating the sheet-forming apparatus 200 of FIG. 6A. Corresponding reference numerals are used. The first (uppermost block) shows the elements required to develop process control instructions. CAD database 180 of an approximate shape is modified by a workstation operator to meet the forming constraints imposed by the apparatus and the formable material. Control element paths are determined or approved by the operator, and the path data are compiled into numerical-control (N.C.) datafile 185 which process controller 190 uses to operate various elements of the apparatus.

The second block shows a main process control CPU which takes instructions from the N.C. datafile and feeds parallel timing and control instructions to three subsidiary process controllers. These in turn operate groups of control elements (see third block) in parallel to execute three sets of forming operations.

The cross-section controller operates linear positioners 217 which control both the curvatures of the final control element (spline assembly 112, which interacts directly with the sheet material) and the rates-of-change of the element through a sequence of cross-sections. The material-exiting-rate controller determines the varying rotation rates of drive wheels 220, 222, and 225 which pull on the exiting stabilized shape. The exiting-shape-orientation controller operates linear positioners 224 which position vertically moveable center drive wheels 222 and variably control their rates-of-change through the movement sequence.

The fourth block contains representative feedback control sensors which track the relevant forming variables in the three groups of operations. The left group of sensors feed back to the cross-section controller (through the main CPU as shown, or directly to the controller). The sensors may indicate positioner extensions, spline assembly curvatures, cross-sectional dimensions of the exiting shape at the transition surface, rates-of-change or any other factors which can give quick feedback on variances from the desired instantaneous cross-sections of the stabilized shape.

The center group of sensors feed back to the material exiting rate controller and may consist simply of rotary encoders for each drive wheel motor, although direct rate sensing of the exiting shape at the transition surface may also be desired. The right group of sensors feed back to the exiting shape orientation controller, and read the vertical positions and position rates-of-change of the drive wheels or of portions of the exiting shape at the transition surface. The vertical position rates-of-change can be compared to the drive wheel motor rates to give "whole-body" radial curvature data.

Many or all of these sensing functions might be performed by a single sensing system which reads position, contours or angles, and movement rates of the exiting shape at the moment of transition and at one or more distant points. Commercially available laser-based sensing systems are capable of measuring profiles, surface rates of movement, and distances from a reference point or line.

Figure 12:
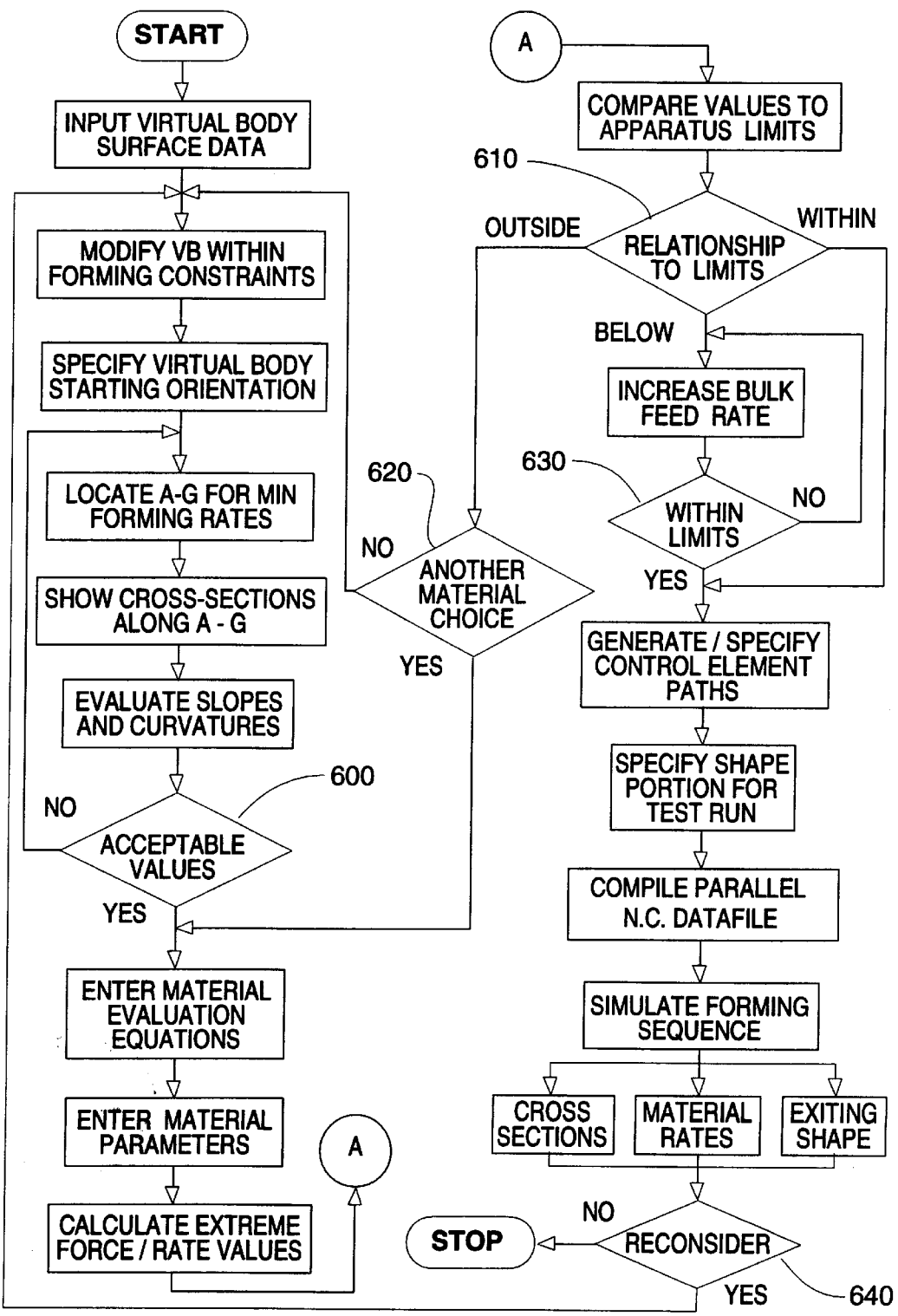
FIG. 12 is a flow diagram of a computer-interactive procedure which incorporates the conceptual elements of FIG. 2A to develop a suitable computer model for use in creating a parallel-operation, multiple-path process control datafile.

Numerical-Control Datafile Development—FIGS. 12–13

The generalized flowchart of FIG. 12 exemplifies a computer-interactive procedure to prepare an N.C. datafile for control of a process incorporating the invention. The procedure involves analyzing and modifying a computer model of a desired shape to fit within process constraints, evaluating a formable material, compiling the control datafile, and viewing a simulation of the forming sequence prior to running an actual shape generating process.

There are many factors to consider regarding a particular complex shape, the materials from which it can be formed, and the capabilities of a forming apparatus. Hence such a process-specific evaluation procedure is a necessary adjunct to a continuous forming system if a considerable range of shapes are to be generated. To this end, the procedure includes a number of decision nodes 600, 610, 620, 630, and 640 at which it is determined whether to proceed with the current parameters or revise them.

Figure 13A:
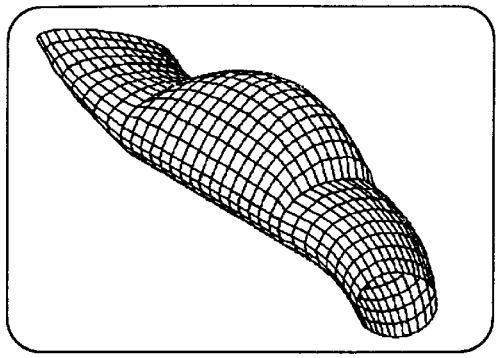
FIGS. 13A–F are simulations of computer displays an operator might produce during the procedure of FIG. 12.
Figure 13B:
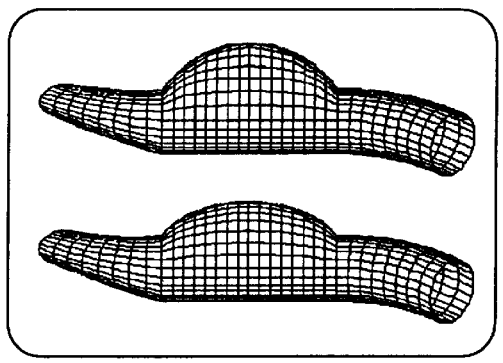

The conceptual elements shown earlier in FIG. 2A can serve as a foundation for the procedure. Utilizing these elements, FIGS. 13A–F show representative computer displays of a shape and onscreen "tools" the designer might utilize to make the interactive procedure relatively simple and intuitive. Beginning the procedure, the virtual body is displayed on the screen in FIG. 13A. The designer may notice sharp radii or extreme angles which are not essential to the function of the shape, and may modify them so as to reduce the rates of movement or rotation of control elements which will form the final shape. FIG. 13B has two views: the original body in profile at the top, and the lower body which shows the designer's reduction of the central bulge's height and its beginning and ending slopes. Such a change, besides reducing the likelihood of exceeding the operating limits of control elements, will permit the actual body to be formed at a faster rate.

Figure 13C:
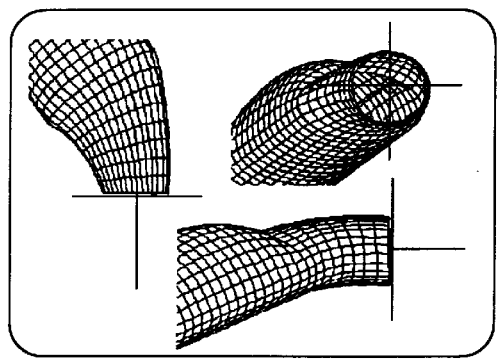

FIG. 13C shows the virtual body oriented on three axes to a starting position in relation to a zero point on the transition surface, here represented by vertical and horizontal axes of a set of X-Y-Z coordinate axes. These coordinates will be "mapped" onto numerical control coordinates when compiling the N.C. datafile. A polar coordinate system might alternatively be employed, with virtual body orientation established with the origination point on the transition surface.

Figure 13D:
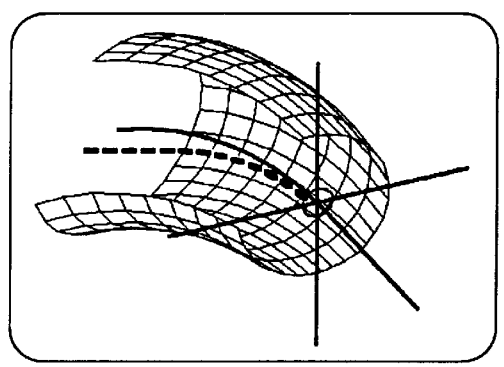

FIG. 13D shows the establishment of a portion of the axis of generation (solid line) and a sequence of cross-sections perpendicular to the axis. Also shown is a tentative modification of the axis (dotted line), intended to reduce the rate-of-change of control elements. Regions of the interior surface may also be viewed and modified, especially if a double-shell structure is to be formed with differing contours on the inner and outer shells.

Figure 13E:
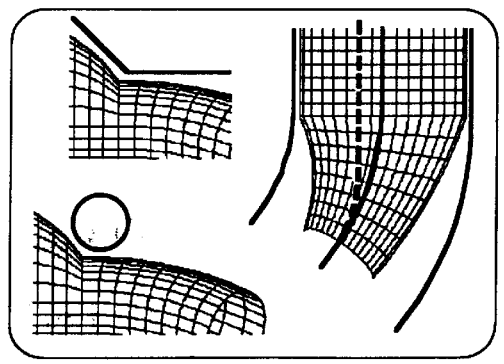

FIG. 13E shows evaluative views of portions of the body at selected extreme regions, as well as visual "tools" which might be employed by the designer. The upper left portion is being compared against an angle tool set to the maximum angle which the cross-section dimensioning final control element can form at a minimum bulk material feed rate. The lower left portion is compared against a radius tool showing the minimum radius permitted by the final control element. The right portion is compared against minimum and maximum curvature tools which show curvatures permitted by differential rates of material movement, in relation to the axis of generation, at the minimum feed rate.

FIG. 12 can now be described in view of the above description of FIGS. 13A≧E. Decision node 600 follows this evaluation of slopes and curvatures, and causes the procedure to loop back to the simplest modification, a repositioning of the axis of generation, if the tests shown in FIG. 13E fail. A more complex decision node might also cause the procedure to loop back to modification of the body if calculation showed that no movement of the axis of generation could satisfy forming requirements.

After an acceptable "best fit" development of the virtual body, the procedure continues from node 600 to a quantitative analysis of candidate material properties in relation to forming apparatus capabilities. Specifications are usually furnished by material producers and include processing temperatures, viscosities, elongation factors, tensile strengths, etc. Equations are often available to determine dynamic factors, such as flow rate with varied pressures and temperatures, and resistance to shear or stretching at varied rates. Control elements of a forming apparatus also have operating limits which may include maximum and minimum flow pressure or material movement rates, rates-of-change, pulling-force limits, spline assembly deformation limits and the like. A material with which the designer is unfamiliar may be initially evaluated at the minimum bulk feed rate to the forming apparatus.

Decision node 610 is a three-way node that follows the comparison of material properties to apparatus capabilities. If forces on the apparatus are too great or if differential movement rates through the apparatus are too slow or too fast, node 610 invokes node 620, at which the designer may choose another material or modify the shape to bring these factors within operating parameters. Node 610 leads to an increase of bulk material feed rate if forming rates are slower than the slowest rates of the varied forming apparatus control elements, and invokes decision node 630. Node 630 allows for incremental increases of the bulk feed rate until it is within suitable limits. If the forming forces and rates are already within limits, node 610 leads to the preparation of control element paths.

Figure 13F:
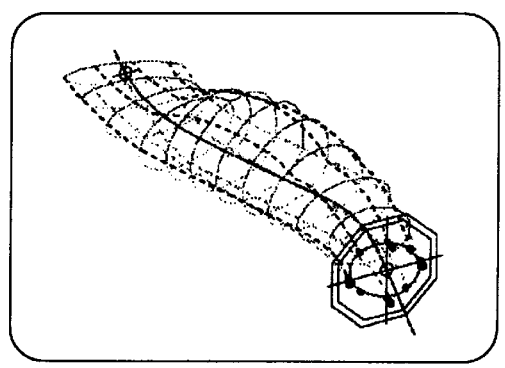

FIG. 13F shows the virtual body reduced to a small number of defining cross-sections, with emphasis given to control element paths. A comprehensive set of control element paths have been generated along the computer model, and are related to the axis of generation by their intersections with the perimeters of the reference cross-sections previously established along the axis. The axis of generation is also shown (bold solid line) as is a general representation of the forming apparatus at the transition surface. Interactive modification of the paths or axis of generation at this stage can give another degree of control over the final shape, such as producing a localized deformation or affecting the degree of material stretch and so the thickness of a shell structure in a particular region. Such modification toward the end of model development would also permit iterative production of varied shapes without going through earlier stages of the design and modification process. For instance another decision node might be introduced to permit the generation of variations which are immediately subjected to process simulations, with those which fall outside of production limits being rejected and the acceptable ones being queued up for actual forming trials.

The designer may then select a specific portion of the virtual body for a trial production run. For instance regions of extreme dimensional change or stretch-elongation might be selected as a test section without the need to generate a whole shape. Following this selection, a trial N.C. datafile is compiled. Since all control elements of the apparatus run simultaneously, at this stage a time factor is introduced to coordinate the parallel operation of the elements. To form the datafile, the starting point on the axis of generation is aligned with the zero point in an X-Y-Z or polar coordinate system for the physical apparatus, and a timed sequential series of cross-sections are "mapped" into the coordinate system so that there is a one-to-one correspondence between the virtual body data and the numerical-control data.

The application program for the procedure then processes the N.C. datafile to run a visual simulation of the shape-forming sequence. A rate of movement of the computer model relative to the transition surface is established. The model passes through the surface with the axis of generation being held perpendicular to and coincident with the zero or origination point in the transition surface, while the virtual and (simulated) actual bodies are variably moved and angled along with the changing orientations of the axis of generation as a whole. This might be an animated sequence which makes explicit the shape-determining variables and highlights the regions which approach the forming limits of the apparatus. The variables include the sequence of cross-sections, the rate-of-change of cross-sections, rates and differential rates of material movement through the transition surface, and relative angles and orientations of the exiting shape to the transition surface.

The designer is then given a final decision node 640 prior to running an actual forming trial. A more complex node might have multiple decision paths to include modifications or additions to the virtual body, different starting orientations, adding portions of the shape to run through simulated forming and so forth.

In summary, the conceptual elements of FIGS. 2A–G serve as the basis for a computer-interactive procedure or application program which a designer uses to develop acceptable material and control element paths and rates. The overall objective of the procedure is to facilitate the design process and to aid in the full use of apparatus incorporating the invention. The procedure includes modifying a computer model of the shape as necessary, evaluating materials for suitability, evaluating capabilities of the apparatus to form the desired shape from candidate materials, establishing geometric paths for the varied control elements of the forming apparatus, introducing parallel timing of the operation of the control elements to coordinate the positions, rates and rates-of-change of the control elements, compiling a numerical-control datafile to operate the control elements in parallel, and testing the datafile in a process simulation. Such a procedure or program is necessary for realizing the full advantages of the invention, and so may be considered a key element of a forming system incorporating the invention.

Figure 14:
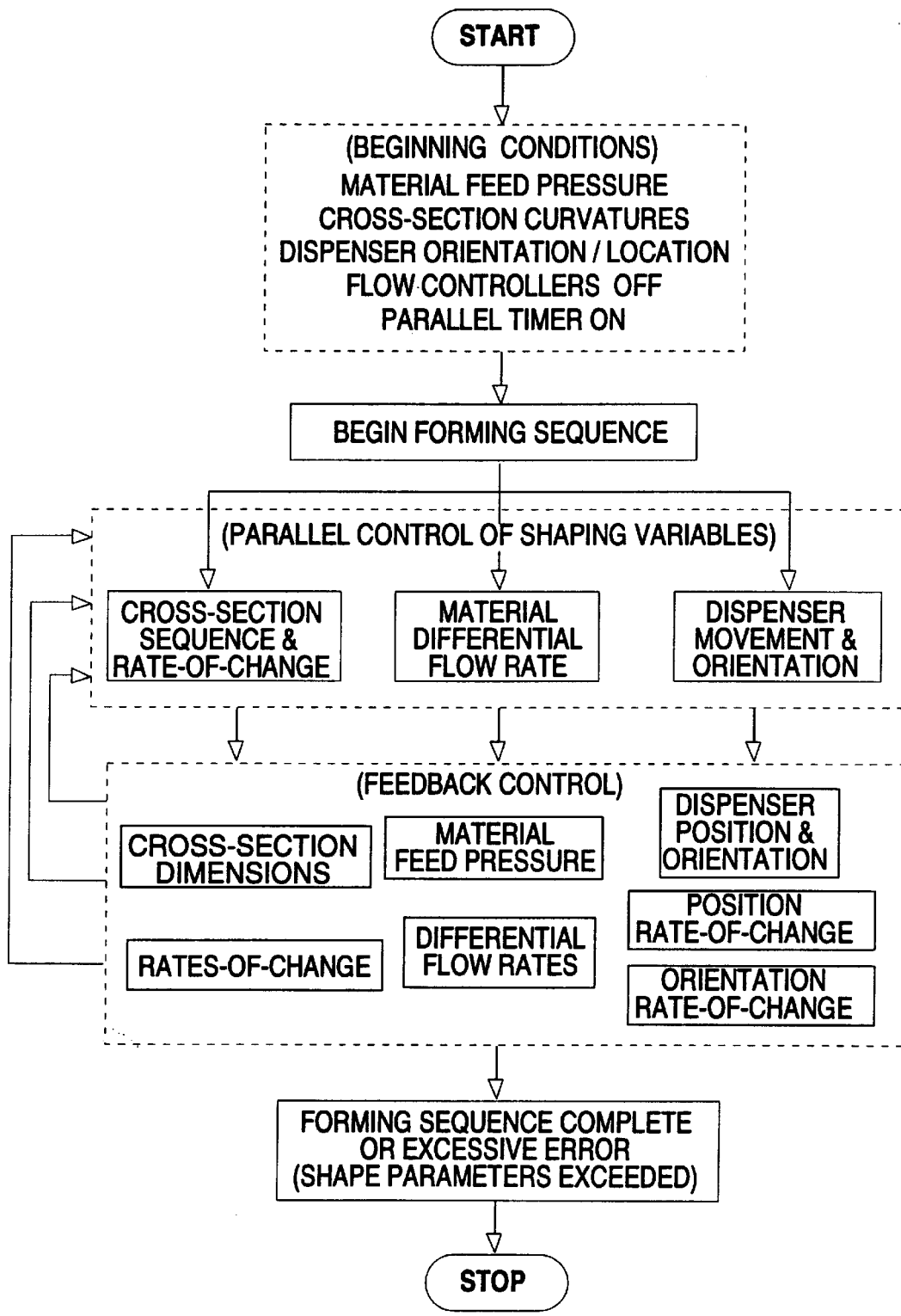
FIG. 14 is a process control diagram for a system incorporating the fluent material forming apparatus of FIG. 7A.
Figure 18A:
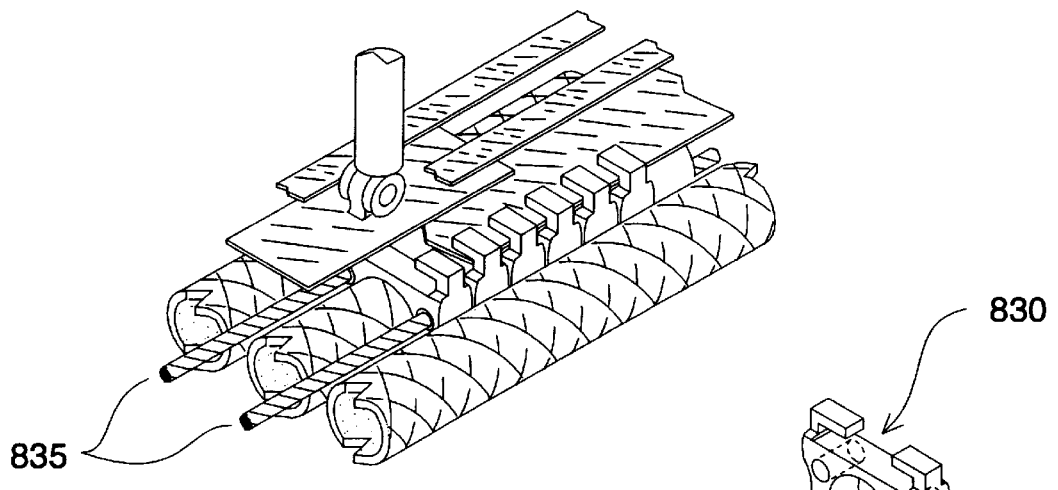
FIGS. 18A–D show a spline assembly using tensioned cables.
Figure 18B:
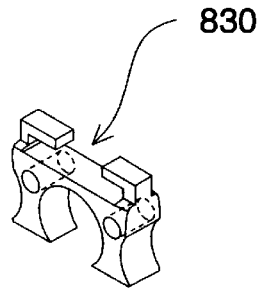
Figure 18C:
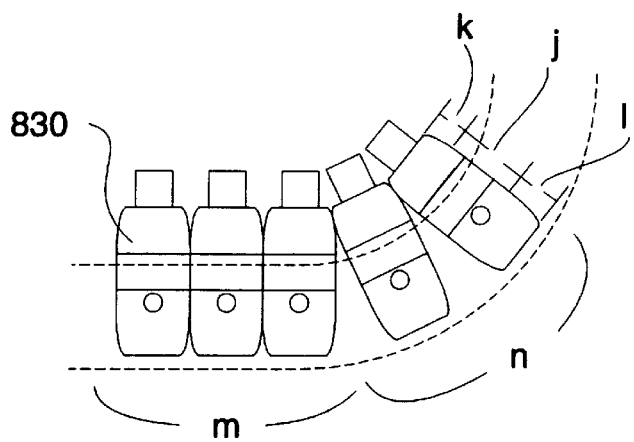
Figure 18D:
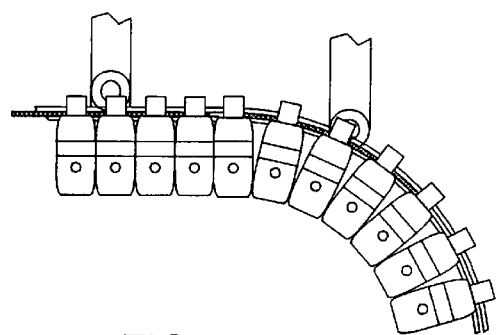

Process Control Diagram—FIG. 14

FIG. 14 is a process control diagram for a system incorporating the fluent material forming apparatus of FIG. 7A. The beginning conditions include a starting material feed pressure to meet maximum flow rate requirements, control elements in position to form the starting cross-section, the cross-section dimensioning mechanism in the proper starting location and orientation, the material flow controllers off, and the timer for parallel operation of control elements turned on and progressing to the forming sequence start. Other checks might precede the forming, as of resin temperatures, chilling fluid temperatures and pressures, and full-range operation of various control elements.

The forming sequence then begins and proceeds with the continuously parallel control of three groups of shaping variables. These include the sequential series and rates-of-change of cross-sections, low rates and differential flow rates of the fluent material, and the continuous movements and orientations of the cross-section dimensioning mechanism.

Feedback control is implemented to keep the three groups of shaping variables within desired ranges. The sequence continues until the desired shape is completely formed, or the process is interrupted due to an apparatus malfunction or the development of excessive error in generation of the shape.

Flexure-Resisting Spline Assemblies (FIGS. 15–18)

FIGS. 15, 16A–D, 17A–D, and 18A–D show spline assemblies incorporating a constrained-spring element or elements. While the primary purpose of the elements is to control the linearity and flexure of spline assemblies which stretch-deform or shear-deform materials, the elements can serve in any cross-section dimensioner to resist weight or other deflecting forces.

Such elements can furnish resistance to flexure until a predetermined force threshold is reached, after which the loaded portion begins to deform. Further, the characteristics of the imposed curvatures can be influenced or controlled by combining the constrained-spring elements with additional components which cause nonlinear variations in the force loadings on the spring elements, or by designing the spring elements to have nonlinear responses to varied loadings. Such control permits, for instance, the forming of circular arcs between three control points rather than parabolic arcs.

FIG. 15 shows conceptually the constrained-spring principle which is employed in the various embodiments described below. A spring 700 has an unloaded length of a. The spring is compressed and held in place by a tensile constraint 702, following which the compressing force is removed. To further compress the spring, a force greater than the original compressing force must be applied. The same principle can also be applied in the reverse manner to a spring under tension. A spring element can be elongated by tensile forces, held in that condition by a compression-resisting element, have the tensile force removed, and remain at the elongated length; it can then be further elongated only by applying tensile forces greater than the original elongating force.

FIGS. 16A–D show pre-compressed spring elements incorporated into pivoting joint assemblies 705, which in turn serve as pins in a chain assembly 707. In each joint assembly, a spring 710 (e.g., a number of nested Belville springs) is held under compression, and cams 715, which are rigidly connected to the chain links, cause further compression when the flexure force exceeds a threshold. The chain assembly of FIG. 16A shows the chain with the linear portions b and d bounding a sharply bent portion c, which condition would occur when flexure forces (shown as opposed arrows) exceed the pre-compressed loading of the spring elements. In the absence of sufficient flexure forces, the chain assembly remains straight.

FIGS. 16B–D show one of pivoting joint assemblies 705 incorporating pre-compressed spring 710. The spring is confined by a pair of plates 720, each of which has a pair of slots 722 on its circumference. The plates are driven inward by the rotation of cams 715, to which outer chain links 725 are rigidly attached. Inner chain links 727 are rigidly attached to a body 730 which holds spring 710 and plates 720. Opposed ridges 732 are formed on the inside walls of housing 730 and engage slots 722 to prevent rotation of the plate relative to the housing.

Each cam has a tapered cam face 735 formed with an annular groove 740 to engage a pair of balls 745, which are held in respective depressions formed in the corresponding plates. The cams are held against the spring force by their mountings 755 on the pin 760, yet are free to rotate independently. Therefore when sufficient deflecting force is placed on the chain links, the forces in the pre-compressed spring elements are overcome. The force which is required to rotate a joint through full travel depends on the slope of the cam face, and can increase linearly or non-linearly, depending on the linearity or nonlinearity of the slope.

FIGS. 17A–D show two embodiments of spline assemblies with pressurized tube elements serving as the constrained spring elements. FIGS. 17A–B show an embodiment with the tube elements disposed transversely to the length of the spline assembly, while FIGS. 17C–D show an embodiment where the tubes run along the spline assembly. The tube elements are pressurized with a gas or a compressible liquid such as a silicone fluid; the internal pressurization must be overcome by outside compressive forces before the tubes begin to change shape.

FIG. 17A shows components of the transverse-tube element spline assembly which are repetitively assembled as spline assembly 765 shown in FIG. 17B. The tube elements each have flexible, but non-stretchable external sleeving 770 which surrounds a flexible, fluid-tight inner liner 775. The tube elements are held in place by spacers 785, each of which has concave faces 790 which accept the tube elements and furnish a contact over a significant proportion of the tube. This permits compression forces to be distributed over a broad area and so meet considerable resistance from internal pressurization. The spacers engage pivot pins 800. A set of tensioning cables 795 penetrate spacers 785 and pivot pins 800 to form the integrated spline assembly shown in FIG. 17B. The tube elements over a section e are shown being compressed on the inner side of the spline assembly curvature; the elements over a section f are shown as they would flatten if bonded to the spacers. In either case the result is to reduce the internal volume of the tube element, furnishing an increasing internal pressure and so an increasing resistance to flexure.

FIG. 17C shows a spacer 810 for the longitudinal tube embodiment. The spacer is formed with through-holes 815 and flares 820. The tube elements are constricted by the through holes and shaped by nesting into the flares to form a series of pressurized beads 822 as shown in the view of spline assembly 823 in FIG. 17D. The beads are compressed on the inner curvature as shown along section g and extended as shown along section h. In both cases the internal volume of the beads is again acting in the same manner as the tube elements in FIGS. 17A–B. The beads will have a greater resistance to compression if they are isolated one from the other, thereby isolating the volume change to each bead. A closure element 825 is forced between the through-hole and the tube elements after the tube is pressurized, thereby eliminating flow between beads. This may be between all beads or only some beads.

FIGS. 18A–D show a spline assembly complete with components for connecting to a positioner and with bleed tubes for providing a gas cushion. While not pertinent to the flexure-controlling properties of the assembly, the strip and slide assembly above, and the three bleed tubes below show how flexure-controlling components are integrated into the full assembly structure.

Spacers 830 are compressed together by tension cables 835 which either possesses elasticity or are coupled to compression springs at the ends of the spline assemblies. The spacers have the opposed faces configured so that they function as cams. Face portion j, adjacent to the through-holes for the tension cables, is flat, while portions k and I are cambered.

The flexural forces applied to region m of the spline assembly are not sufficient to overcome tension in the cables, so the spacers remain seated against one another on the flat portions and the assembly does not curve. The forces applied to region n have exceeded tension in the cables, so that the spacers are free to roll against one another on the portions k. The increasing distance between each spacer at the through-hole either progressively stretches the cables or compresses the end springs. Since the line of contact on the spacers moves progressively further from the through-holes, there is an increasingly greater resistance to further deflection.

Cross-Section Dimensioner with Pivoting Positioning Elements (FIG. 19)

Figures 19A, 19B:
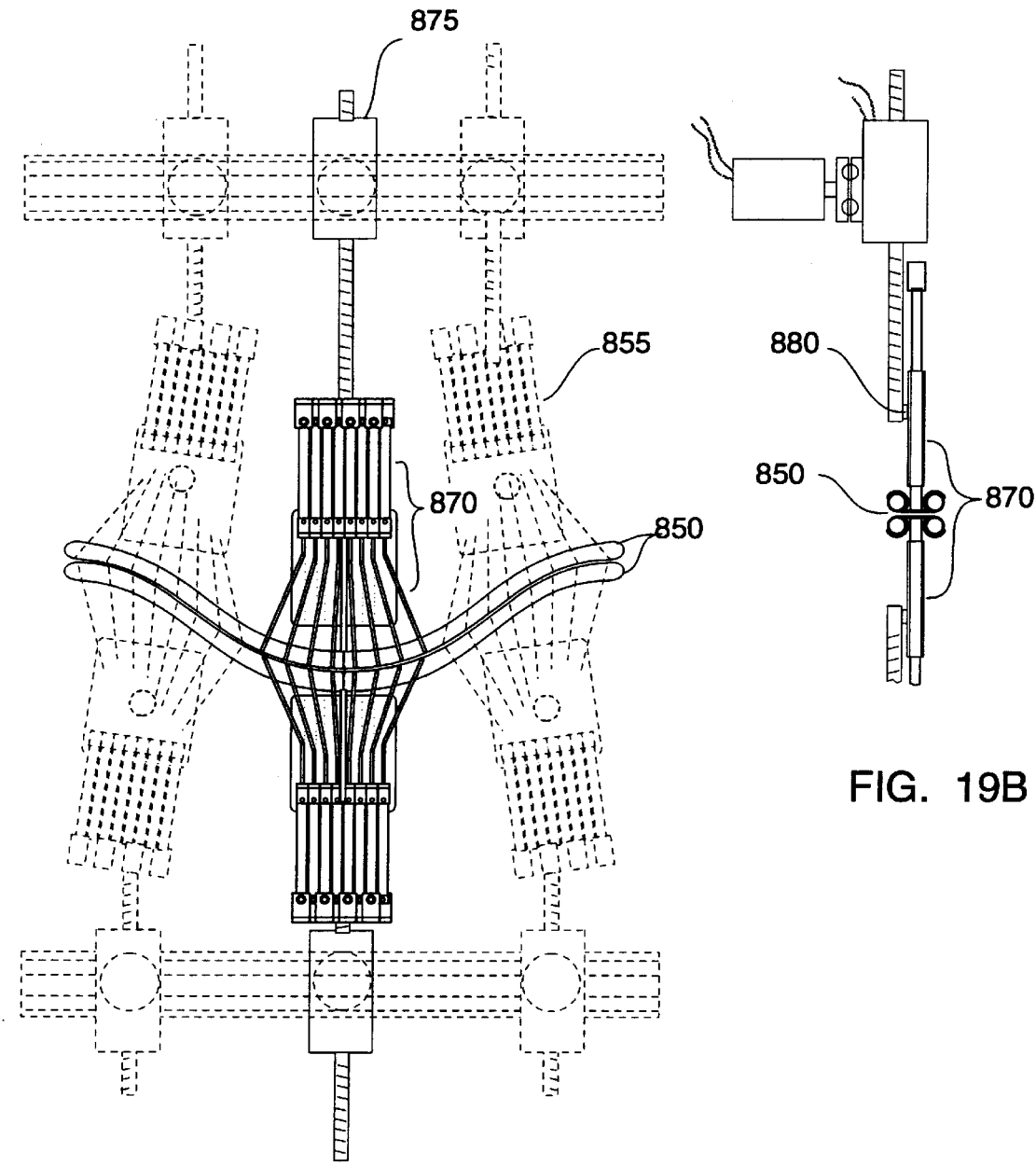
FIGS. 19A–G show an embodiment of a cross-section dimensioner in which pivoting positioning elements are connected through pin bearings directly to the spline assembly.
Figure 19C:
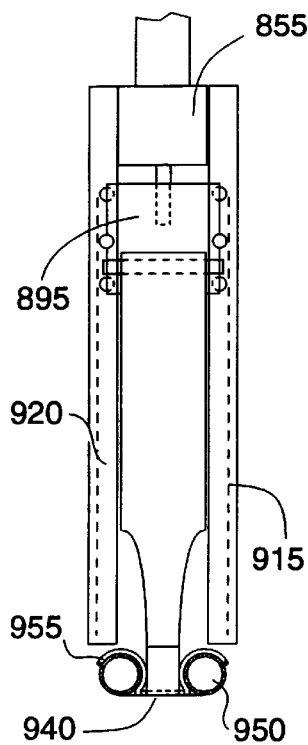

FIGS. 19A–B show a cross-section dimensioner in which pivoting spline drive or positioning elements are connected through pin bearings directly to the spline assembly. This direct connection of positioners to the spline is an alternative to the sliding or rolling contact shown between positioners and splines in previous figures.

Each positioning element is driven by a computer-controlled valve/cylinder which functions as a linear actuator 855. The actuator-positioner combinations 860 are further grouped into robotic "hands 870," each of which may be independently positioned transversely and vertically by a two-axis positioner or drive 875. The hands may also pivot freely or be rotatably driven about a center point 880, as shown in FIG. 19B. If driven, a third rotating positioner would control the pivot angle.

FIGS. 19C–G show in detail a "hand" with pivoting drive elements 890. A carriage 895, to which each drive element is mounted via a pivot pin 900, is carried by ball bearings 910 which run in vertical grooves 915 on two opposed slide plates 920. Carriage 895 is vertically positioned by linear actuator 855 as previously described. Pivot pin 900 connects each drive element 935 to its carriage. The central drive element may be fixed rigidly to the carriage so that it does not pivot. It will then offer thrust resistance to prevent the spline assembly 850 from shifting laterally under asymmetrical forces exerted transversely by the material being formed. This rigid mounting would be employed if a rotating positioner were employed to pivot the hand.

A spline pivot pin 940 in turn connects each drive element to a flexible plate 945 (FIG. 19D) which, along with spline tubes 950 and spline tube brackets 955, comprises the spline assembly. Each pivot pin connection of the drive element to the flexible plate constitutes a control point which can be driven into various positions, as shown in FIG. 19A. The positions of all of the control points at any one instant determine a particular configuration or transverse profile into which the spline assembly is flexed.

Incidentally, the gas bearing for this type of spline is generated by bleeding gas at a proper temperature through fine perforations in the pressurized spline tubes. The flat surface of the flexible plate confines gas between itself and the surface of the material being formed, and so furnishes a bearing without the need for gas to be bled out through the plate surface.

Figure 19D:
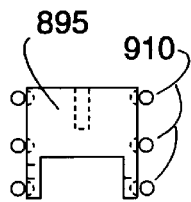
Figure 19E:
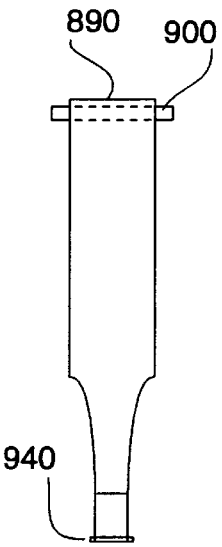
Figure 19F:
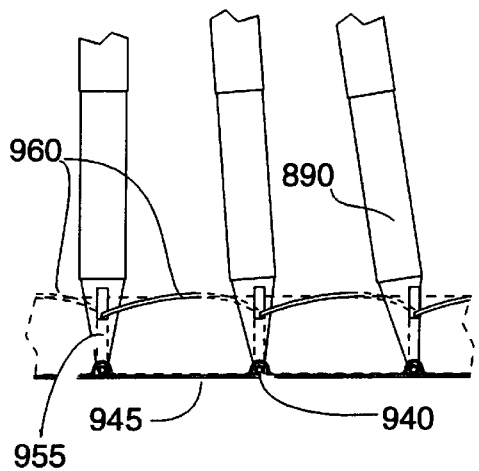
Figure 19G:
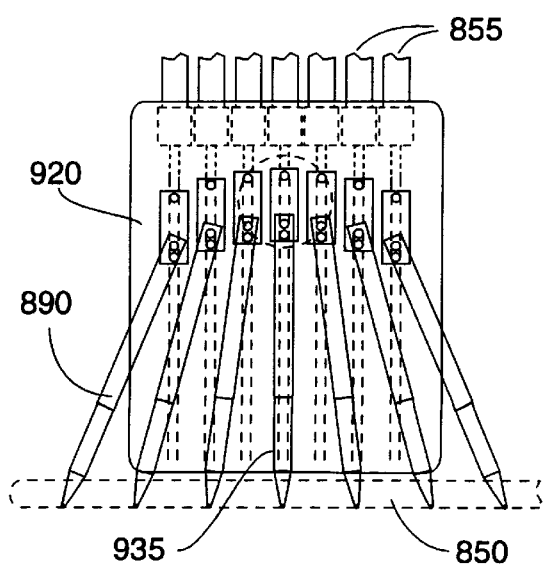

FIG. 19D also shows a simple method of stiffening or adding additional flexure resistance to the pressurized spline tubes. A wire harness 960 supports the tube by being attached from one spline bracket 955 to the next. Specifically, the harness might be attached to the outer edge of one tube bracket, be led over the tube to the inside edge of another, and so repeatedly bridge the distance between brackets with tensioned elements. These elements will help to oppose thrusting forces against the spline assembly which are caused by resistance to deformation of the sheet material being formed. Other methods might also be employed to increase the flexure resistance of the tube 950, to include contrained-spring elements as shown in the earlier FIGS. 16–18.

Stabilizing Element with Internal Spline and Footing Elements (FIG. 20)

Figure 20A:
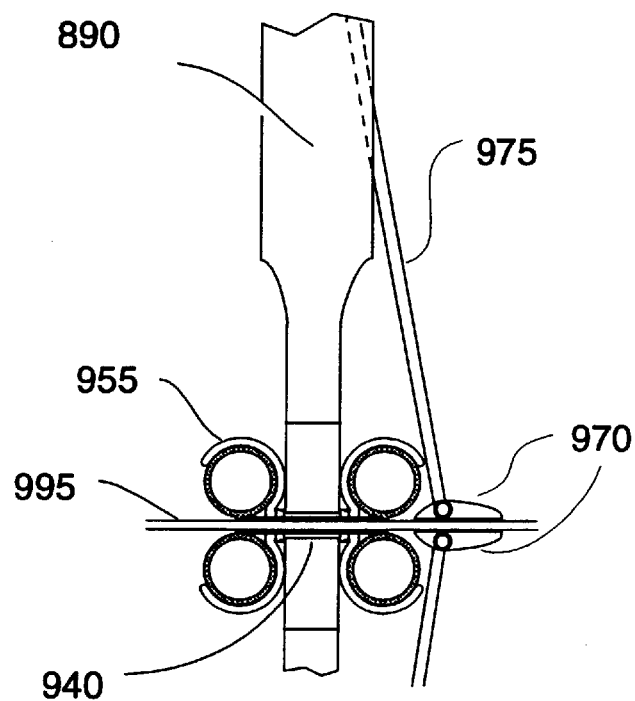
Figure 20B:
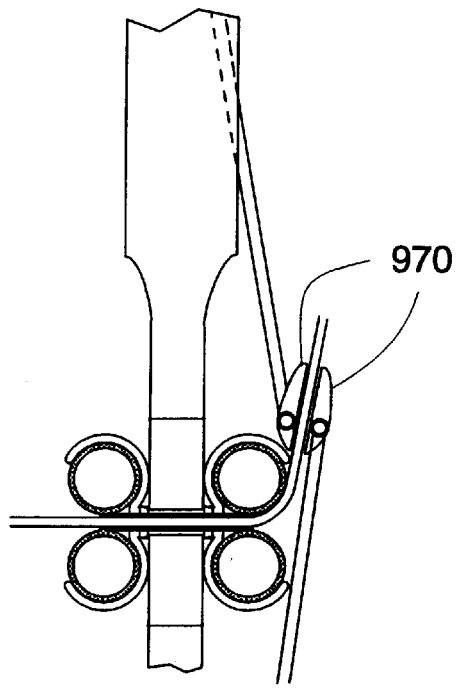

FIGS. 20A–D show an arrangement of opposed spline assemblies and chillers. The chillers are continuous elements which are transversely situated generally parallel to the plane in which the spline assemblies are positioned. They serve as stabilizing elements for the thermoplastic material being formed. Opposed chillers 970 are shown in FIG. 20A in a centered position, as would be assumed if horizontal portions of material were being stabilized. In FIG. 20B the chillers are shown elevated to an extreme angled position. They are free to travel from that position to an equally extreme position below the center of the opposed splines.

The small size of each chiller element, coupled with the inclined orientations of the slides or positioners 975 upon which they are opposedly carried, permits the elements to be guided through a relatively small linear distance (approximately twice the spline tube diameter) while remaining in opposition to one another through a wide angular range. The result shown is that the thermoplastic sheet being formed can achieve angles up to eighty degrees from the horizontal.

FIGS. 20C–G show a chiller comprising a flexible coolant containment chamber 980 which is carried by an small, internal, flexible chiller spline 985 (FIG. 20E), to which the chiller slides 975 are pivotably attached. The slides may have an air cylinder or other means of applying a constant slight force to hold the chillers against the sheet material being stabilized. Alternatively, the chillers might be actively positioned by linear actuators, as previously described in reference to the cross-section dimensioning spline assembly 850. Such active positioning would allow the chiller assembly to hold the just-stabilized portion of a shape being formed against potential deforming forces resulting from tension in the formable material.

A coolant 990 flows into the thin-film structure of the containment chamber. The construction of the chamber is similar to that of an "I-beam" air mattress construction, with flexible ribs connecting the inner and outer faces to one another. A fluid pressure can be maintained in the chamber to hold its shape, allowing it to be pressed uniformly against the faces of the sheet material. The chamber can also be perforated on the leading edge and on the underside to permit a small quantity of fluid to bleed out and form a thin lubricating and conducting layer between the chamber and the sheet surface. Additionally, the chiller is designed to conform to any curvature in the sheet, as shown in FIG. 20D.

The thin film allows conduction of heat from the material being stabilized to the contained coolant, which is circulated to maintain a near-constant chilled temperature. Entry for the coolant is into the frontal portion of the chamber, so that the greatest temperature differential, and therefore the fastest cooling rate, is achieved immediately after initial contact of the chiller or chiller fluid with the material being formed. In FIG. 20C the sheet material 995 is shown transitioning substantially from a stretch-deformable state to a stabilized state prior to passing the chiller spline, which imposes contact or support forces against the faces of the sheet.

FIGS. 20E–G shows how the chiller assembly is designed to conform to surfaces of variable curvature. Flexible footing elements 1000, made of a very thin sheet of material with elastic spring properties, resides within the coolant chamber, and is pre-curved inward (towards the surface of the material being stabilized). This curvature allows the element to maintain continuous contact with a surface of the same or a greater radius of curvature. The footing elements are pin-connected (1010) to the chiller spline 985 so that elements can pivot in the plane of the spline. The pinned fingers 1020 can be convoluted (FIG. 20G) or otherwise configured so that they form a flexible "bridge" between the chiller spline and the leading and trailing edges of the footing elements. FIG. 20F shows includes a bottom view of the chiller assembly without the containment chamber.

The footing elements can also be formed from fine spring wire bent into a variety of forms which offer a combination of elasticity and a controlled range of flexure. They can likewise be formed from any other material or material combination with a configuration which allows the chiller to maintain contact with the range of angled surfaces imposed by the cross-section dimensioning spline assembly upon the material being formed.

Conclusion

Thus it can be seen that the invention provides unique new capabilities for generating complex shapes, without the use of dies, molds or other fixed tooling, in a computer-controlled forming process. The process may be applied to materials in a stretch-deformable, shear-deformable, or fluent state, or to a combination of materials and components, with the resulting shapes being formed in a single continuous operation. The invention also provides an interactive method for analyzing and modifying a computer model of a desired shape and for developing a process control datafile to operate groups of control elements in a forming process.

There are many avenues for further development of continuous molding processes and apparatus. Improvements are being sought in cross-section dimensioning mechanisms which reduce their complexities, increase their accuracies in assuming curvatures, increase the forces which they can exert on materials, and extend the range of dimensional changes. An important improvement in a spline assembly, for instance, would be to have a "detente" force threshold beneath which the assembly would maintain an inflexible linear configuration. Above the "detente" threshold the assembly would begin to flex under positioner loadings, yet would remain so stiff in relation to the resistant forces in the material being formed that high accuracy would be maintained for any degree or complexity of curvature. Another ideal attribute would be for the spline assembly to curve to very small radii so that relatively sharp corners might be imposed in both axes on formable materials.

Another important improvement would be the capability to "cold form" inelastic sheet materials by imposing high forces while retaining spline-like variability in the dimensioning mechanism. The range of candidate materials could be extended to include highly reinforced thermoplastics, "pre-peg" thermosetting composites which are currently stamped or matched-die molded, and superplastic metal alloys. The challenges are formidable, and may entail the development of entirely new mechanisms. For instance a "pulling spline" may have to operate in conjunction with the dimensioning mechanism in an intermittent process, with forming principles of the invention being employed in "active intervals." The shuttle concept described with reference to FIG. 9 might be developed into a high strength spline-like form and might flex horizontally.

Techniques and apparatus might be developed for generating shapes from bias-laid plies of oriented fiber sheets. Again the challenges are considerable if composite constructions of uniform density, predetermined thickness and proper surface smoothness are to be generated in a single pass through a forming apparatus. A related challenge is to create composite shapes from knitted or woven preforms, to incorporate filament winding techniques into the molding process, or to introduce bulk molding compound or other discrete reinforcement materials into specific regions as a shape is molded.

Cross-linkable resins might be molded by incorporating a "stabilizing" ultraviolet light source or catalyst-dispensing element into a dimensioning mechanism. For instance shell structures might be formed in a bulk liquid resin by either process if the thickness of cross-linked material were directly dependent on exposure time or distance from the "stabilizer."

A non-obvious candidate for continuous molding might be reinforced concrete shell structures. A weight-bearing reinforcing mesh would be formed by a moving dimensioning assembly, and a fine-grained concrete would be dispensed under pressure to permeate and coat the reinforcement. A "troweling" or surface-smoothing capability would also be incorporated into the trailing edge of the assembly so that a finished shape would be formed and cured in place.

While the above specification describes particular embodiments of the invention, these should not be construed to be limitations on the invention's scope, but rather as examples of the invention's broad applicability. As mentioned above, there are many other useful embodiments, which might further include apparatus with multiple cross-section determining mechanisms working in concert, systems which merge numerous materials (both fluent and deformable) into a single structure, and those which combine deformable or thermoplastic materials with curable materials to include polymers, concrete, ceramic compounds and the like.

While the above is a full description of the preferred embodiments, various modifications, alternative constructions, and equivalents may be used. Therefore, the above description should not be taken as limiting the scope of the invention which is defined by the appended claims.

What is claimed is:

1. Apparatus for forming a fluent material into any of a variety of predetermined shapes, comprising:
   a flexible fluent-material dispenser which is relatively positionable to assume a variety of desired curvilinear configurations;
   a positioner array for controlling the configuration of said fluent-material dispenser in accordance with a desired predetermined shape;
   a mechanism that delivers fluent material to said fluent-material dispenser;

a mechanism that controls rates and differential rates of exiting flow from said fluent-material dispenser;

cooling elements for causing the fluent material to abruptly enter a non-formable state as it exits the fluent material dispenser, said cooling elements guiding the material so that it becomes an addition to a stabilized portion of the formed shape; and a mechanism that effects relative motion between the formed shape and the fluent-material dispenser.

2. The apparatus of claim 1, wherein the mechanism that effects relative motion transports the formed portion of the shape away from the fluent-material dispenser so as to match the rate and angle of movement of the stabilized portion to the rate and angle of movement of the material being formed at the moment of stabilization.

3. The apparatus of claim 1, wherein the mechanism that effects relative motion moves the fluent-material dispenser away from the formed portion of the shape so as to opposedly match the rate and angle of movement of the formed material at the moment of stabilization.

* * * * *